United States Patent
Debes et al.

(10) Patent No.: US 7,430,578 B2
(45) Date of Patent: Sep. 30, 2008

(54) METHOD AND APPARATUS FOR PERFORMING MULTIPLY-ADD OPERATIONS ON PACKED BYTE DATA

(75) Inventors: Eric Debes, Santa Clara, CA (US);
William W. Macy, Palo Alto, CA (US);
Jonathan J. Tyler, Austin, TX (US);
James Coke, Shingle Springs, CA (US);
Frank Binns, Hillsboro, OR (US); Scott Rodgers, Hillsboro, OR (US); Peter Ruscito, Folsom, CA (US); Bret Toll, Hillsboro, OR (US); Vesselin Naydenov, Folsom, CA (US); Masood Tahir, Orangevale, CA (US); David Jackson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 10/610,831

(22) Filed: Jun. 30, 2003

(65) Prior Publication Data

US 2004/0073589 A1 Apr. 15, 2004

Related U.S. Application Data

(63) Continuation-in-part of application No. 09/952,891, filed on Oct. 29, 2001, now Pat. No. 7,085,795.

(51) Int. Cl.
*G06F 7/38* (2006.01)
(52) U.S. Cl. .................................... 708/603
(58) Field of Classification Search .................. 708/603
See application file for complete search history.

(56) References Cited

U.S. PATENT DOCUMENTS

| 3,641,736 A | 2/1972 | Dwyer |
| 3,675,001 A | 7/1972 | Singh |
| 3,711,692 A | 1/1973 | Batcher |
| 3,723,715 A | 3/1973 | Chen et al. |

(Continued)

FOREIGN PATENT DOCUMENTS

DE 3636106 4/1987

(Continued)

OTHER PUBLICATIONS

Avaro, Olivier, et al., "MPEG-4 Systems Overview Architecture", woody.imag.fr/MPEG4/syssite/syspub/docs/tutorial, (May 25, 1998), 72 pages.

(Continued)

*Primary Examiner*—David H Malzahn
(74) *Attorney, Agent, or Firm*—Lawrence M. Mennemeier

(57) ABSTRACT

A method and apparatus for including in a processor instructions for performing multiply-add operations on packed byte data. In one embodiment, a processor is coupled to a memory. The memory has stored therein a first packed byte data and a second packed byte data. The processor performs operations on data elements in said first packed byte data and said second packed byte data to generate a third packed data in response to receiving an instruction. A plurality of the data elements in this third packed data storing the result of performing multiply-add operations on data elements in the first and second packed byte data.

32 Claims, 19 Drawing Sheets

U.S. PATENT DOCUMENTS

| | | |
|---|---|---|
| 3,900,724 A | 8/1975 | McIver et al. |
| 3,941,990 A | 3/1976 | Rabasse |
| 4,161,784 A | 7/1979 | Cushing et al. |
| 4,344,151 A | 8/1982 | White |
| 4,393,468 A | 7/1983 | New |
| 4,418,383 A | 11/1983 | Doyle et al. |
| 4,498,177 A | 2/1985 | Larson |
| 4,542,476 A | 9/1985 | Nagafuji |
| 4,677,582 A | 6/1987 | Nagafuji |
| 4,707,800 A | 11/1987 | Montrone et al. |
| 4,760,525 A | 7/1988 | Webb |
| 4,760,545 A | 7/1988 | Inagami et al. |
| 4,761,753 A | 8/1988 | Izumisawa |
| 4,771,379 A | 9/1988 | Ando et al. |
| 4,811,269 A | 3/1989 | Hirose et al. |
| 4,876,660 A | 10/1989 | Owen et al. |
| 4,890,218 A | 12/1989 | Bram |
| 4,945,479 A | 7/1990 | Rusterholz et al. |
| 4,956,801 A | 9/1990 | Priem et al. |
| 4,972,362 A | 11/1990 | Elkind et al. |
| 4,985,848 A | 1/1991 | Pfeiffer et al. |
| 4,989,168 A | 1/1991 | Kuroda et al. |
| 5,001,662 A | 3/1991 | Baum |
| 5,032,865 A | 7/1991 | Schlunt |
| 5,047,975 A | 9/1991 | Patti et al. |
| 5,081,698 A | 1/1992 | Kohn |
| 5,095,457 A | 3/1992 | Jeong |
| 5,111,422 A | 5/1992 | Ullrich |
| 5,126,964 A | 6/1992 | Zurawski |
| 5,161,247 A | 11/1992 | Murakami et al. |
| 5,187,679 A | 2/1993 | Vassiliadis et al. |
| 5,189,636 A | 2/1993 | Patti et al. |
| 5,193,167 A | 3/1993 | Sites et al. |
| 5,210,711 A | 5/1993 | Rossmere et al. |
| 5,222,037 A | 6/1993 | Taniquchi |
| 5,227,994 A | 7/1993 | Ohki |
| 5,241,492 A | 8/1993 | Girardeau, Jr. |
| 5,241,493 A | 8/1993 | Chu et al. |
| 5,262,976 A | 11/1993 | Young et al. |
| 5,268,995 A | 12/1993 | Diefendorff et al. |
| 5,293,558 A | 3/1994 | Narita et al. |
| 5,303,355 A | 4/1994 | Gergen et al. |
| 5,311,508 A | 5/1994 | Buda et al. |
| 5,321,644 A | 6/1994 | Schibinger |
| 5,325,320 A | 6/1994 | Chiu |
| 5,327,369 A | 7/1994 | Ashkenazi |
| 5,327,543 A | 7/1994 | Miura et al. |
| 5,390,135 A | 2/1995 | Lee et al. |
| 5,410,670 A | 4/1995 | Hansen et al. |
| 5,420,815 A | 5/1995 | Nix et al. |
| 5,426,598 A | 6/1995 | Hagihara |
| 5,426,783 A | 6/1995 | Norrie et al. |
| 5,442,799 A | 8/1995 | Murakami et al. |
| 5,457,805 A | 10/1995 | Nakamura |
| 5,487,022 A | 1/1996 | Simpson et al. |
| 5,487,159 A | 1/1996 | Byers et al. |
| 5,500,811 A | 3/1996 | Corry |
| 5,506,865 A | 4/1996 | Weaver, Jr. |
| 5,509,129 A | 4/1996 | Guttag et al. |
| 5,515,520 A | 5/1996 | Hatta et al. |
| 5,517,438 A | 5/1996 | Dao-Trong et al. |
| 5,528,529 A | 6/1996 | Seal |
| 5,541,865 A | 7/1996 | Ashkenazi |
| 5,576,983 A | 11/1996 | Shiokawa |
| 5,579,253 A | 11/1996 | Lee et al. |
| 5,590,365 A | 12/1996 | Ide et al. |
| 5,594,679 A | 1/1997 | Iwata |
| 5,606,677 A | 2/1997 | Balmer et al. |
| 5,636,351 A | 6/1997 | Lee |
| 5,642,306 A | 6/1997 | Mennemeier et al. |
| 5,651,121 A | 7/1997 | Davies |
| 5,673,427 A | 9/1997 | Brown et al. |
| 5,701,508 A | 12/1997 | Glew et al. |
| 5,712,797 A | 1/1998 | Descales et al. |
| 5,719,642 A | 2/1998 | Lee |
| 5,721,697 A | 2/1998 | Lee |
| 5,721,892 A | 2/1998 | Peleg et al. |
| 5,734,874 A | 3/1998 | Van Hook et al. |
| 5,737,537 A | 4/1998 | Gardos et al. |
| 5,740,037 A | 4/1998 | McCann et al. |
| 5,742,529 A | 4/1998 | Mennemeier et al. |
| 5,742,840 A | 4/1998 | Hansen et al. |
| 5,765,037 A | 6/1998 | Morrison et al. |
| 5,778,419 A | 7/1998 | Hansen et al. |
| 5,790,208 A | 8/1998 | Kwak et al. |
| 5,793,661 A | 8/1998 | Dulong et al. |
| 5,793,900 A | 8/1998 | Nourbakhsh et al. |
| 5,794,060 A | 8/1998 | Hansen et al. |
| 5,794,061 A | 8/1998 | Hansen et al. |
| 5,802,336 A | 9/1998 | Peleg et al. |
| 5,805,913 A | 9/1998 | Guttag et al. |
| 5,806,049 A | 9/1998 | Petruzzi |
| 5,809,321 A | 9/1998 | Hansen et al. |
| 5,819,101 A | 10/1998 | Peleg et al. |
| 5,822,603 A | 10/1998 | Hansen et al. |
| 5,835,392 A | 11/1998 | Dulong et al. |
| 5,841,676 A | 11/1998 | Ali et al. |
| 5,852,473 A | 12/1998 | Horne et al. |
| 5,852,726 A | 12/1998 | Lin et al. |
| 5,859,997 A * | 1/1999 | Peleg et al. ................ 712/221 |
| 5,862,067 A | 1/1999 | Mennemeier et al. |
| 5,865,752 A | 2/1999 | Seyed-Bolorforosh et al. |
| 5,870,619 A | 2/1999 | Wilkinson et al. |
| 5,876,342 A | 3/1999 | Chen et al. |
| 5,880,979 A | 3/1999 | Mennemeier et al. |
| 5,880,983 A | 3/1999 | Elliott et al. |
| 5,883,824 A | 3/1999 | Lee et al. |
| 5,884,071 A | 3/1999 | Kosaraju |
| 5,884,089 A | 3/1999 | Orian et al. |
| 5,907,842 A | 5/1999 | Mennemeier et al. |
| 5,909,552 A | 6/1999 | Jensen et al. |
| 5,936,872 A | 8/1999 | Fischer et al. |
| 5,938,756 A | 8/1999 | Van Hook et al. |
| 5,946,405 A | 8/1999 | Kim et al. |
| 5,953,241 A | 9/1999 | Hansen et al. |
| 5,983,256 A * | 11/1999 | Peleg et al. ................ 708/523 |
| 5,983,257 A | 11/1999 | Dulong |
| 6,006,318 A | 12/1999 | Hansen et al. |
| 6,018,351 A | 1/2000 | Mennemeier et al. |
| 6,026,483 A | 2/2000 | Oberman et al. |
| 6,035,316 A | 3/2000 | Peleg et al. |
| 6,035,387 A | 3/2000 | Hsu et al. |
| 6,041,403 A | 3/2000 | Parker et al. |
| 6,058,408 A | 5/2000 | Fischer et al. |
| 6,115,812 A | 9/2000 | Abdallah et al. |
| 6,122,725 A | 9/2000 | Roussel et al. |
| 6,154,831 A | 11/2000 | Thayer et al. |
| 6,178,482 B1 | 1/2001 | Sollars |
| 6,192,467 B1 | 2/2001 | Abdallah et al. |
| 6,211,892 B1 | 4/2001 | Huff et al. |
| 6,230,253 B1 | 5/2001 | Roussel et al. |
| 6,230,257 B1 | 5/2001 | Roussel et al. |
| 6,233,671 B1 | 5/2001 | Abdallah et al. |
| 6,237,016 B1 | 5/2001 | Fischer et al. |
| 6,260,137 B1 | 7/2001 | Fleck et al. |
| 6,295,599 B1 | 9/2001 | Hansen et al. |
| 6,370,558 B1 * | 4/2002 | Guttag et al. ................ 708/603 |
| 6,378,060 B1 | 4/2002 | Hansen et al. |
| 6,385,634 B1 * | 5/2002 | Peleg et al. ................ 708/490 |
| 6,418,529 B1 | 7/2002 | Roussel |
| 6,470,370 B2 | 10/2002 | Fischer et al. |
| 6,502,117 B2 | 12/2002 | Golliver et al. |
| 6,584,482 B1 | 6/2003 | Hansen et al. |
| 6,643,765 B1 | 11/2003 | Hansen et al. |

| | | | |
|---|---|---|---|
| 6,725,356 | B2 | 4/2004 | Hansen et al. |
| 6,745,319 | B1 | 6/2004 | Balmer et al. |
| 7,085,795 | B2 | 8/2006 | Debes et al. |
| 2001/0016902 | A1 | 8/2001 | Adballah et al. |
| 2002/0059355 | A1* | 5/2002 | Peleg et al. ............. 708/603 |
| 2004/0220992 | A1 | 11/2004 | Peleg et al. |

FOREIGN PATENT DOCUMENTS

| | | |
|---|---|---|
| DE | 19914617 | 10/1999 |
| EP | 0308124 | 3/1989 |
| FR | 2563349 | 10/1985 |
| GB | 2339040 | 1/2000 |
| JP | 3268024 | 3/1990 |
| JP | 6266554 | 9/1994 |
| WO | WO-9708608 | 3/1997 |
| WO | WO-9708610 | 3/1997 |
| WO | WO-9722921 | 6/1997 |
| WO | WO-9722923 | 6/1997 |
| WO | WO-9722924 | 6/1997 |
| WO | WO-9723821 | 7/1997 |
| WO | WO-9950740 | 10/1999 |

OTHER PUBLICATIONS

Bierling, M., "Displacement estimation by hierarchical blockmatching", *SPIE*, vol. 1001, *Visual Communications and Image Processing*, (May 1998), pp. 942-951.

Chan, Y. L., et al., "Adaptive multiple-candidate hierarchical search for block matching algorithm", *Electronics Letters* vol. 31 No. 19, (Sep. 14, 1995), pp. 1637-1639.

Chan, Yui-Lam, et al., "New Adaptive Pixel Decimation for Block Motion Vector Estimation", *IEEE Transactions on Circuits and Systems on Video Technology*, vol. 6, No. 1, (Feb.1996), pp. 113-118.

Chen, Liang-Gee, et al., "An Efficient Parallel Motion Estimation Algorithm for Digital Image Processing", *IEEE Transactions on Circuits and Systems on Video Technology*, vol. 1, No. 4, (Dec. 1991), pp. 378-384.

Cheng, K. W., et al., "Fast Block Matching Algorithms for Motion Estimation", 0-7803-3192-3/96 *IEEE*, (May 1996), pp. 2311-2314.

Corbal, Jesus, et al., "DLP + TLP Processors for the Next Generation of Media Workloads", 0-7695-1019-1/01 *IEEE*, (2001), pp. 219-228.

Day, Neil, et al., "Coding of Moving Pictures and Video", *International Organization for Standardization ISO/IEC JTC1/SC29/WG11 N4032*, (Mar. 2001), pp. 1-10.

Diefendorff, Keith, et al., "AltiVec Extension to Power PC Accelerates Media Processing", #0272-1732/00, (2000), pp. 85-95.

Dufaux, Frederic, et al., "Efficient, Robust, and Fast Global Motion Estimation for Video Coding", *IEEE Transactions on Image Processing*, vol. 9, No. 3, (2000), pp. 497-501.

Eckart, Stefan, et al., "ISO/IEC MPEG-2 software video codec", *SPIE* vol. 2419, (1995), pp. 100-109.

Edirisinghe, E. A., et al., "Shape Adaptive Padding for MPEG-4", *IEEE Transactions on Consumer Electronics*, vol. 46, No. 3, (2000), pp. 514-520.

Feng, J., et al., "Adaptive block matching motion estimation algorithm for video coding", *Electronics Letters* vol. 31, No. 18, (1995), pp. 1542-1543.

Furht, Borko, et al., "Motion Estimation Algorithms for Video Compression", *Florida Atlantic University*, Kluwer Academic Publishers, (1997), pp. Cover-vi, 11 & 49-95.

Ghanbari, M., "The Cross-Search Algorithm for Motion Estimation", *IEEE Transactions on Communications*, vol. 38, Ni. 7, (Jul. 1990), pp. 950-953.

He, Zhongli, et al., "A High Performance Fast Search Algorithm for Block Matching Motion Estimation", *IEEE Transactions on Circuits and Systems for Video Technology*, vol. 7, No. 5., (Oct. 1997), pp. 826-828.

He, Zhongli, et al., "Design of Fast Motion Estimation Algorithm Based on Hardware Consideration", *IEEE Transactions on Circuits and Systems for Viedo Technology*, vol. 7, No. 5, (Oct. 1997), pp. 819-823.

Heising, Guido, et al., "MPEG-4 Version 2 Video Reference Software Package", AC098/HHI\WP5.1\DS\P\049\B1, (1998), Abstract and pp. 1-8.

Intel Corporation, "Block-Matching In Motion Estimation Algorithms Using Streaming SIMD Extensions 2 (SSE2)", Version 2.0, (Sep. 2000), pp. 1-13, A:1-A:2.

International Organisation, For Standardisation, "Coding of Moving Pictures and Audio", *ISO/IEC JTC1/SC29/WG11 N3932*, Pisa, (Jan 2001), 35 pages.

International Organisation For S, "Coding of Moving Pictures and Audio", *ISO/IEC JTC1/SC29/WG11 N3675*, La Baule, (Oct. 2000), 12 pages.

Jain, Jaswant R., et al., "Displacement Measurement and Its Application in Interframe Image Coding", *IEEE Transactions on Communications*, vol. Com-29, No. 12, (Dec. 1981), pp. 1799-1808.

Ju, John C., et al., "a Fast Rate-Optimized Motion Estimation Algorithm for Low-Bit-Rate Video Coding", *IEEE Transactions on Circuits and Sytems for Video Technology*, vol. 9, No. 7, (1999), pp. 994-1002.

Jung, Hae M., et al., "An Annular Search Algorithm for Effiicident Motion Estimation", *International Picture Coding Symposium*, Melbourne, Australia, (1996), pp. 171-174.

Kappagantula, S., et al., "Motion Compensated Interframe Image Prediction", 0090-6778/85/0900-1011 *IEEE*, (1985), pp. 1011-1015.

Kim, Joon-Seek, et al., "A Fast Feature-Based Block Matching Algorithm Using Integral Projections", *IEEE Journal on Selected Areas in Communications*, vol. 10, No.. 5, (Jun. 1992), pp. 968-971.

Kim, Michelle, "Coding of Moving Pictures and Audio", *ISO/IEC 14496-1:19999/Amd.2:2000(E)*, (Jun. 2000), pp. 1-19.

Kneip, Johannes, et al., "Applying and Implementing the MPEG-4 Multimedia Standard", 0273-1732/99 *IEEE*, (1999), pp. 64-74.

Kneip, J., et al., "The MPEG-4 Video Coding Standard - A VLSI Point of View", *IEEE Workshop on Signal Processing Systems (SIPS98)*, (Oct. 8-10, 1998), pp. 43-52, A-1, A-2.

Koenen, Rob, "Overview of the MPEG-4 Standard", *International Organisation for Standardisation ISO/IEC JTC1/SC29/WG11 N4030*, (Mar. 2001), pp. 1-69.

Koga, T., et al., "Motion-Compensated Interframe Coding for Video Conferencing", *Nippon Electric Co., Ltd.*, Kawasaki, Japan, CH1679-0/81/000-0312 IEEE, (1981), pp. G5.3.1-G 5.3.3.

Kuhn, Peter, "Algorithms, Complexity Analysis and VLSI Architectures for MPEG-2 Motion Estimation", *Kluwer Academic Publishers*, Boston, (1999), pp. cover-vi, 15, 17-59, 107-109, 119-121, 147-167 & 189-204.

Kuhn, Peter M., et al., "Complexity Analysis of the Emerging MPEG-4 Standard as a Basis for VLSI Implementation", *SPIE Vo. 3309*, (Jan. 1998), pp. 498-509.

Lee, Xiaobing, et al., "A Fast Hierarchical Motion-Compensation Scheme for Video Coding Using Block Feature Matching", *IEEE Transactions on Circuits and Systems for Video Technolog*, vol. 6, No. 6, (Dec. 1996), 627-635.

Lee, Liang-Wei, et al., "Dynamic Search-Window Adjustment and Interlaced Search for Block-Matching Algorithm", *IEEE Transactions on Circuits and Systems for Video Technology*, vol. 3, No. 1, (Feb. 1993), pp. 85-87.

Lee, Woobin, et al., "MediaStation 5000: Integrating Video and Audio", 1070-986X/94 *IEEE*, (1994), pp. 50-61.

Lengwehasatit, Krisda, et al., "A Novel Computationally Scalable Algorithm for Motion Estimation", *SPIE Vo. 3309*, 0277-786X/97, (Jan. 1998), pp. 66-79.

Li, Renxiang, , et al., "A New Three-Step Search Algorithm for Block Motion Estimation", *IEEE Transactions on Circuits and Systems for Video Technology*, vol. 4, No. 4, (Aug. 1994), pp. 438-442.

Li, W., et al., "Successuve Elimination Algorithm for Motion Estimation", *IEEE Transactions on Image Processing*, vol. 4, No. 1, (Jan. 1995, pp. 105-107.

Liang, Jie, et al., "Region-Based Video Coding with Embedded Zero-Trees", *IEEE* 1068-0314/97, (1997), p. 449.

Liu, Lurng-Kuo, et al., "A Block-Based Gradient Descent Search Algorithm for Block Motion Estimation in Video Coding", *IEEE Transactions on Circuits and Systems for Video Technology*, vol. 6, No. 4, (Aug. 1996), pp. 419-422.

Liu, Bede, et al., "New Fast Algorithms for the Estimation of Block Motion Vectors", *IEEE Transactions on Circuits and Systems for Video Technology*, vol. 3, No. 2, (Apr. 1993), pp. 148-157.

Mo, Hyeon-Cheol, et al., "A High-Speed Pattern Decoder in MPEG-4 Padding Block Hardware Accelerator", *IEEE* 0-78036685-9/01, (2001), pp. 197-200.

Moschetti, Fulvio, et al., "A Fast Block Matching for SIMD Processors Using SubSampling", *ISCAS 2000 - IEEE International Symposium on Circuits and Systems*, Geneva, Switzerland, (2000), pp. 321-324.

Moschetti, F., et al., "About MacroBlock SubSampling for Motion Estimation on IA-64", *2001 IEEE International Conference on Multimedia Expo*, Tokyo, Japan, (Aug. 2001), 4 pages.

Nam, Kwon M., et al., "A Fast Hierarchical Motion Vector Estimation Algorithm Using Mean Pyramid", *IEEE Transactions on Circuits and Systems for Video Technology*, vol. 5, No. 4, (Aug. 1995), pp. 344-351.

Netravali, Arun N., et al., "Digital Pictures Representation and Compression", *Plennum Press*, New York and London, (1988), pp. cover - XV, 334-340, 354-355.

Pirsch, Peter, et al., "VLSI Architectures for Video Compression - A Survey", *Proceedings of the IEEE*, vol. 83, No. 2, (Feb. 1995), pp. 220-246.

Po, Lai-Man, et al., "A Novel Four-Step Search Algorithm for Fast Block Motion Estimation", *IEEE Transactions on Circuits and Systems for Video Technology*, vol. 6, No. 3, (Jun. 1996), pp. 313-317.

Puri, A., et al., "An Efficient Block-Matching Algorithm for Motion-Compensation Coding", *IEEE*, CH2396-0/87/000-1063, (1987), pp. 2.4.1-25.4.4.

Ragsdale, Gary L., et al., "Relationships of Popular Transmission Characteristics to Perceived Quality for Digital Video Over ATM", *National Communications Systems TIB 99-2*, (Jan. 1999), 64 pages.

Ramkishor, K., et al., "Real Time Implementation of MPEG-4 Video Decoder on ARM7TDMI", *Proceedings of 2001 International Symposium on Intelligent Multimedia, Video and Speech Processing*, Hong Kong, (May 2001), pp. 522-526.

Shi, Y. Q., et al., "Thresholding Multiresolution Block Matching Algorithm", *IEEE Transactions on Circuits and Systems for Video Technology*, vol. 7, No. 2, (Apr. 1997), pp. 437-440.

Sikora, Thomas, "MPEG Digital Video Coding Standards", *Reprint from Digital Consumer Electronics Handbook, First Edition*, McGraw-Hill Book Company, (1997), pp. 1-43.

Sikora, Thomas, "MPEG-1 and MPEG-2 Digital Video Coding Standards", *Digital Consumer Electronics Hanbook*, McGraw-Hill Company, (1997), pp. 1-43.

Sikora, Thomas, "The Structure of The MPEG-4 Video Coding Algorithm", *IEEE Transaction on Circuits and Systems for Video Technology (invited paper)*, (Jun. 1996), pp. 1-16.

Song, Byung C., et al., "A hierarchical block matching algorithm using partial distortion criteria", *SPIE 3309 VCIP Visual Communications and Image Processing*, San Jose, CA, (1998), pp. 88-95.

Srinivasan, Ram, et al., "Predictive C ding Based on Efficient Motion Estimation", *IEEE Transaction on Communication*, vol. COM-33, No. 8, (Aug. 1985), pp. 888-896.

Stolberg, H. J., et al., "The M-Pire MPEG-4 Codec DSP and its Macroblock Engine", *ISCAS 2000 - IEEE International Symposium on Circuits and Systems*, Geneva, Switzerland, (2000), pp. II-192 - II-195.

Tham, Jo Y., et al., "A Novel Unrestricted Center-Biased Diamond Search Algorithm for Block Motion Estimation", *IEEE Transactions on Circuits and Systems for video Technology*, vol. 8, No. 4, (1998), pp. 369-377.

Van Der Schaar, Miheala, et al., "Near-Lossless Complexity-Scalable Embedded Compression Algorithm for Cost Reduction in DTV Receivers", *IEEE Transaction on Cossumer Electronics*, vol. 46, No. 4, (2000), pp. 923-933.

Wang, Chung-Neng, et al., "Improved MPEG-4 Visual Texture Coding Using Double Transform Coding", 0-7803-6685-9/01 *IEEE*, (2001), pp. V-227 - V-230.

Westerink, P. H., et al., "Two-pass MPEG-2 variable-bit-rage encoding", *IBM J. Res. Develop.* vol. 43, No. 4, (Jul. 1999), pp. 471-488.

Wittenburg, J. P., et al., "HiPAR-DSP: A Parallel VLIW RISC Processor for Real Time Image Processing Applications", 0-7803-4229-1/97 *IEEE*, (1997), pp. 155-162.

Xu, Jie-Bin, et al., "A New Prediction Model Search Algorithm for Fast Block Motion Estimation", *Proceedings International Conference on Image Processing*, vol. III of III, Santa Barbara, California, (1997), pp. 610-613.

Yu, Fengqi, et al., "A Flexible Hardware-Oriented Fast Algorithm for Motion Estimation", *1997 IEEE International Conference on Acoustics, Speech, and Signal Processing*, vol. IV of V, Integrated Circuits and Systems Laboratory, University of California, Los Angeles, (1997), pp. 2681-2683.

Zhu, Shan, et al., "A New Diamond Search Algorithm for Fast Block-Matching Motion Estimation", *IEEE Transactions on Image Processing*, vol. 9, No. 2, (Feb. 2000), pp. 287-290.

"Complaint", *In the United States District Court for the Distric of Delaware, In the matter of Transmeta v. Intel Corporation*, (Oct. 11, 2006), 1-7.

"EP9630495", *EPO Search Report*, (Nov. 18, 1999), 2.

"First Amended Complaint", *In the United States District Court for the District of Delaware, In the matter of Transmeta Corporation v. Intel Corporation*, C.A. No. 06-663 (GMS), (Dec. 12, 2006), 1-8.

"Intel Corporation's Answer, Affirmative Defenses, And Counterclaims To Transmeta's First Amended Complaint", *In the United States District Court for the District of Delaware, In the matter of Transmeta Corporation v. Intel Corporation*, Civil Action No. 06-663-GMS, (Jan. 9, 2997), 1-27.

"MIPS V Instruction Set", MIPS V Specification, Rev. 1.0, pp. B1-37.

"Transmeta Corporation's Reply To Intel Corporation's Counterclaims To The First Amended Complaint", *In the United States District Court for the District of Delaware, In the matter of Transmeta v. Intel Corporation*, (Feb. 28, 2007), 1-20.

"Transmeta Corporation's Responses To Intel Corporation's First Set Of Interrogatories (Nos. 1-20)", *In the United States District Court for the District of Delaware, In the matter of Transmeta v. Intel Corporation*, Redacted, (May 21, 2007), 42 pages.

U.S. Appl. No. 10/611,621, "Office Action", (Aug. 4, 2006), 1-6.

Abbott, Curtis, et al., "Broadband Algorithms with the MicroUnity Mediaprocessor", *Proceedings of COMPCON '96*, (1996), 349-354.

Advanced Micro Devices, Inc., "AMD-3D Technology Manual", (Feb. 1998), pp. i-x, 1-58.

Bipolar Integrated Technology, "BIT Preliminary", B3110/B3120: B2110/B2120 *Floating Point Chip Set*, 1-40.

Case, Brian, "Philips Hopes to Displace DSPs with VLIW", *Microprocessor Report*, (dec. 1994), pp. 12-15.

Convex Computer Corporation, "C4/XA Architecture Overview", *Convex Technical Marketing*, (Feb. 1994), 279 pages.

Convex Computer Corporation, "Convex C3200 Supercomputer System Overview", *Revision 2.01*, (Jul. 24, 1991), 55 pages.

Convex Computer Corporation, "Saturn Architecture Specification", (Apr. 29, 1993), 88 pages.

Elkind, Bob, et al., "A Sub 10 nS Bipolar 64 Bit Integrated/Floating Point Processor Implemented on Two Circuits", *IEEE 1987 BCTM*, (198), 101-104.

Farmwald, Paul M., "High Bandwidth Evaluation of Elementary Functions, S-1 Project", *IEEE*, (1981), 139-142.

Farmwoald, P.M., "On the Design of High Performance Digital Arithmetic Units", *UCRL-53190*, (Aug. 1981), i-viii & 1-95.

Grimes, Jack, et al., "64-Bit Processor. The Intel i860 64-Bit Processor: A General Purpose CPU with 3D Graphics Capabilities", (Jul. 1989), 85-94.

Gwennap, Linley, "New PA-RISC Processor Decodes MPEG Video", *Microprocessor Report*, (Jan. 1994), pp. 16-17.

Hansen, Craig, "Architecture of a Broadband Mediaprocessor", *MicroUnity Systems Engineering, Inc.*, Proceedings of COMPCOMN '96, (1996), pp. 334-340.

Hayes, Raymond, et al., "MicroUnity Software Development Environment", *Proceedings of COMPCON '96*, (1996), 341-348.

Hewlett Packard, "64-Bit and Multimedia Extensions in the PA-RISC 2.0 Architecture", (Jul. 17, 1997), 1-18.

IBM, "TDB: Double Speed, Single Precision Vector Register Organization Using Double Port Chips", (Feb. 1981), 1-6.

Ide, Nobuhiro, et al., "A 320-MFLOPS CMOS Floating-Point Processing Unit for Superscalar Processors", *IEEE Journal of Solid State Circuits*, vol. 28, No. 3, (Mar. 1993), 352-361.
Iino, Hideyuki, et al., "ISSCC 92 Session 6 / Microprocessors / TA 6.5: A 289MFLOPS Single-Chip Supercomputer", *1992 IEEE International Solid State Circuits Conference*, (1992), 112-113.
Intel Corporation, "i860 Microporcessor Family Programmer's Reference Manual", (1992), Ch. 1, 3, 8 & 12.
Intel Corporation, "IA-32 Intel Architecture Software Developer's Manual", *Vol. 1: Basic Architecture*, www.intl.com, order No. 245470, (2001), 418 pages.
Intel Corporation, "IA-32 Intel Architecture Software Developer's Manual", *vol. 3: System Programming Guide*, www.intel.com, order No. 245472, (2001), 688 pages.
Intel Corporation, "Intel 80386 Programmer's Reference Manual", (1986), 421 pages.
Intel Corporation, "Intel Architecture Software Developer's Manual", *vol. 2: Instruction Set Reference*, (2001), 854 pages.
Intel Corporation, "Pentium II Processor Developer's Manual", www.intel.com, order No. 243502-001, (Oct. 1997), 226 pages.
Intel Corporation, "Pentium Processor Family Developer's Manual", www.intel.com, (1997), 609 pages.
Intel Corporation, "Pentium Processor User's Manual", *vol. 3: Architecture and Programming Manual*, (1993), Ch. 1, 3-4, 6, 8 & 18.
Intel Corporation, "Willamette** Processor Software Deveopler's Guide", http://developer.intel.com/design/processor/index.htm, (Feb. 2000), 314 pages.
Kawakami, Yuichi, et al., "LSI Applications: A Single-Chip Digital Signal Processor for Voiceband Application", *Solid State Circuits Conference, Digest of Technical Papers, IEEE International*, (1980), 3 pages.
Killian, Earl, "MIPS Extension for Digital Media", *Silicon Graphics, Inc.*, 1-10.
Kohn, Les, et al., "Introducing the Intel i860 64 Bit Microprocessor", *Intel Corporation*, (Aug. 1989), 15-30.
Kohn, L., et al., "The Visual Instruction Set (VIS) in UltraSPARC", *SPARC Technology Business - Sun Microsystems, Inc.*, (1995), pp. 462-469.
Lamport, Leslie, "Multiple Byte Processing With Full-Word Instructions", *ACM*, (1975), pp. 471-475.
Lawrence Livermore Laboratory, "S-1 Uniprocessor Architecture", (Apr. 21, 1983), 386 pages.
Lawrence Livermore Laboratory, "vol. I: Architecture - The 1979 Annual Report - The S-1 Project", (1979), 443 pages.
Lawrence Livermore Laboratory, "vol. II: Hardware - The 1979 Annual Report - The S-1 Project", (1979), 366 pages.
Lee, Ruby B., "Accelerating Multimedia with Enhanced Microprocessors", *Hewlett Packard. IEEE Micro*, (Apr. 1995), pp. 22-32.
Lee, Ruby B., "Realtime MPEG Video via Software Decompression on a PA-RISC Processor", *1995 IEEE*, (1995), 186-192.
Leibowitz, Bob, et al., "System Design: ECL gains ground in battle against CMOS", *Computer Design*, (Apr. 1, 1987), 91-95.
Levinthal, Adam, et al., "Chap-A SIMD Graphics Processor", *Computer graphics Project, Lucasfilm Ltd.*, (1984), pp. 77-82.
Levinthal, Adam, et al., "Parallel Computers for Graphics Applications", *Pixar*, San Rafael, CA, (1987), 193-198.
Manferdelli, John L., et al., "Signal Processing Aspects of the S-1 Multiprocessor Project", *UCRL-84658*, (Jul. 28, 2980), 1-8.
Margulis, Neal, "i860 Microprocessor Architecture", *McGraw Hill, Inc.*, (1990), Ch. 6-8 & 10-11.
MIPS Technologies, Inc,, "MIPS Extension for Digital Media with 3D", (Mar. 12, 1997), 30 pages.
Motorola, Inc., "Errata to MC88110 Second Generation RISC Microprocessor User's Manual", (1992), pp. 1-11.
Motorola, Inc., "MC88110 Programmer's Reference Guide", (1992), pp. 1-4.
Motorola, Inc., "MC88100 Second Generation RISC Microprocessor User's Manual", MC8110UM/AD, (1991), 619 pages.
PCT/US96/12799, "Search Report", (Nov. 26, 1996), 1.
Philips Electronics, "TriMedia TM1000 Preliminary Data Book", (1997), 496 pages.
Samsung Electronics, "21164 Alpha Microprocessor Data Sheet", (1997), 121 pages.

Santoro, Mark R., "Design and Clocking of VLSI Multipliers", *Technical Report No. CSL-TR-89-397*, (Oct. 1989(, i-xiii and 1-118.
Santoro, Mark, et al., "Session II: High-Speed Microprocessor", *A Pipelined 64X64b Interactive Array Multiplier*, IEEE International Solid State Circuits Conference, (36-37 & 290), 1998.
Santoro, Mark R., et al., "SPIM: A Pipelined 64X64 bit Interactive Multiplier", *IEEE Journal of Solid-State Circuits*, vol. 24, No. 2, (Apr. 1989), 487-493.
Shipnes, J., "Graphics Processing with the 88110 RISC Microprocessor", *IEEE*, (1992), pp. 169-174.
Silicon Graphics, Inc., "MNIPS Digital Media Extension", pp. C1-C40.
Silicon Graphics, Inc., "Silicon Graphics Introduces Compact MIPS@ RISC Microprocessor Code for High Performance at a Low Cost", www.sgi.com, (OCt. 21, 1996), 1-2.
Silicon Graphics, Inc., "Silicon Graphics Introduces Enhanced MIPS architecture to Lead the Interactive Digital Revolution", (Oct. 21, 1996), pp. 1-2.
Spanderna, D., et al., "An Intergrated Floating Point Vector Processor for DSP and Scientific Computing", *SHARP Microelectronics Technology, Inc., IEEE*, (19989), 8-13.
Sun Microsystems, Inc., "Real-Time MPEG2 Decode with the Visual Instruction Set (VIS)", *ULTRASPARC and New Media Support*, (1996), 1-8.
Sun Microsystems, Inc., "the ULTRASPARC Processor - Technology White Paper", (1995), 35 pages.
Sun Microsystems, Inc., "The VIS Instruction Set", (1997), 1-2.
Sun Microsystems, Inc., "The Visual Instruction Set (VIS): On Chip Support for New-Media Processing", *ULTRASPARC*, (1996), 1-7.
Sun Microsystems, Inc., "Turbocharges Network Operations on New Media Computing", *ULTRASPARC*, (1996), 1-5.
Sun Microsystems, Inc., "Ultra Port Archictecture (UPA): The NEw-Media System Architecture", *ULTRASPARC*, (1996), 1-4.
Sun Microsystems, Inc., "UltraSPARC Multimedia Capabilities On-Chip Support for Real-Time Video and Advanced Graphics", *SPARC Technology Business*, (Sep. 1994), 8 pages.
Sun Microsystems, Inc., "Visual Instruction Set (VIS) User's Guide", Version 1.1, (Mar. 1997), 130 pages.
Swartzlander Jr., Earl, et al., "Proceedings: 11th Symposium on Computer Arithmetic", Windsor Ontario, (Jun. 29 - 2, 1993), 171-178.
Texas Instruments, "TMS320C2X User's Guide", (1993), pp. 3:2-3:11; 3:28-3:34; 4:1-4:22; 4:22; 4:41; 4:103; 4:119-4:120; 4:122; 4:150-4:151.
Undy, Steve, et al., "A Low-Cost Graphics and Multimedia Workstation Chip Set", *IEEE Micro*, (1994), 10-22.
Wang, Yulun, et al., "A Processor Architecture for 3D Graphics", *IEEE Computer Graphics & Applications*, (sep. 1992), 96-105.
Wang, Yulan, et al., "A Processor Architecture for 3D Graphics Calculations", *Computer Motion, Inc.*, (sep. 1992), pp. 1-23.
Wang, Yulun, et al., "The 3DP: A Processor Architecture for Three-Dimensional Applications", *IEEE*, (Jan. 1992), 25-36.
Widdoes Jr., L. C., "The S-1 Project: Developing High-Performance Digital Computers", *IEEE Computer Society*, (Dec. 11, 1979), pp. 1-10.
"Final Joint Claim Construction Chart", *In the United States District Court for the District of Delaware, In the Matter of Transmeta Corporation v. Intel Corporation*, C.A. No. 06-699 (GMS), (Oct. 10, 2007), pp. 1-215.
"Intel Corporation's Opening Claim Construction Brief", *In the United States District Court for the District of Delaware, In the Matter of Transmeta Corporationv. Intel Corporation*, C.A. No. 06-633-GMS, (Oct. 19, 2007), pp. 1-76.
"Intel Corporation's Responses to Transmeta's First Set of Interrogatories to Intel Corporation(Nos. 1-24)", *In the United States District Court for the District of Delaware, In the Matter of Transmeta Corporationv. Intel Corporation*, C.A. No. 06-633-GMS, (May 18, 2007), pp. 1-132.
"Intel Corporation's Supplemental Responses to Transmeta Interrogatory Nos. 8, 9, 12, 19 and 21-23"; *In the United States District Court for the District of Delware, In the Matter of Transmeta Corporationv. Intel Corporation*, C.A. No. 06-633-GMS, (Aug. 23, 2007), pp. 1-27.

"Transmeta Corporation's Amended and Supplemental Responses to Intel Corporation's First Set of Interrogatories (Nos. 1, 3, 4, 5, 8, 13, 15)" (Redacted Version), *In the United States District Court for the District of Delaware, In the Matter of Transmaeta Corporation v. Intel Corporation*, C.A. No. 06-633-GMS, (Aug. 23, 2007), 84 pages (including Exhibits 15-18 totaling 46 pages).

"Transmeta Corporation's Opening Claim Construction Brief", *In the United States District Court for the District of Delaware, In the matter of transmeta v. Intel Corporation*, C.A. No. 06-633-GMS, (Oct. 19, 2007), pp. 1-66.

Hansen, Craig , "Terpsichore System Architecture", *MicroUnity Systems Engineering, Inc.*, (Aug. 2, 1995), 380 pages.

IBM, Inc., "The PowerPC Architecture", (May 1994), 533 pages.

Margulis, Neal , "i860 Microprocessor Arcitecture", *McGraw Hill, Inc.*, (1990), Ch. 1-3 (86 pages).

Transmeta Corporation, "Transmeta Announces Settlement of Patent Litigation, Technology Transfer and License Agreement with Intel", *Press Release*, printed from the Internet site (http://investor.transmeta.com/releasedetail.cfm?ReleaseID=271024), (Oct. 24, 2007), one page.

Hansen, Craig, "Terpsichore System Architecture", *MicroUnity Systems Engineering, Inc.*, (Jun. 2, 1995), 368 pages.

\* cited by examiner

FIG. 4a

| 127 112 111 | 96 95 | 80 79 | 64 63 | 48 47 | 32 31 | 16 15 | 0 |
|---|---|---|---|---|---|---|---|
| B15 B14 B13 | B12 B11 B10 | B9 B8 | B7 B6 | B5 B4 | B3 B2 | B1 B0 | |

Packed Byte 421

| 127 112 111 | 96 95 | 80 79 | 64 63 | 48 47 | 32 31 | 16 15 | 0 |
|---|---|---|---|---|---|---|---|
| Half 7 | Half 6 | Half 5 | Half 4 | Half 3 | Half 2 | Half 1 | Half 0 |

Packed Half 422

| 127 | 96 95 | 64 63 | 32 31 | 0 |
|---|---|---|---|---|
| Single 3 | Single 2 | Single 1 | Single 0 |

Packed Single 423

| 127 | 64 63 | 0 |
|---|---|---|
| Double 1 | Double 0 |

Packed Double 424

FIG. 4b

| 63 | 56 55 | 48 47 | 40 39 | 32 31 | 24 23 | 16 15 | 8 7 | 0 |
|---|---|---|---|---|---|---|---|---|
| bbbb bbbb | bbbb bbbb | bbbb bbbb | bbbb bbbb | bbbb bbbb | bbbb bbbb | bbbb bbbb | bbbb bbbb | |

Unsigned packed byte in-register representation 510

| 63 | 56 55 | 48 47 | 40 39 | 32 31 | 24 23 | 16 15 | 8 7 | 0 |
|---|---|---|---|---|---|---|---|---|
| sbbb bbbb | sbbb bbbb | sbbb bbbb | sbbb bbbb | sbbb bbbb | sbbb bbbb | sbbb bbbb | sbbb bbbb | |

Signed packed byte in-register representation 511

FIG. 5a

| 63 | 48 47 | 32 31 | 16 15 | 0 |
|---|---|---|---|---|
| bbbb bbbb bbbb bbbb | bbbb bbbb bbbb bbbb | bbbb bbbb bbbb bbbb | bbbb bbbb bbbb bbbb | |

Unsigned packed word in-register representation 512

| 63 | 48 47 | 32 31 | 16 15 | 0 |
|---|---|---|---|---|
| sbbb bbbb bbbb bbbb | sbbb bbbb bbbb bbbb | sbbb bbbb bbbb bbbb | sbbb bbbb bbbb bbbb | |

Signed packed word in-register representation 513

FIG. 5b

| 63 | 32 31 | 0 |
|---|---|---|
| bbbb bbbb bbbb bbbb bbbb bbbb bbbb bbbb | | bbbb bbbb bbbb bbbb bbbb bbbb bbbb bbbb |

Unsigned packed doubleword in-register representation 514

| 63 | 32 31 | 0 |
|---|---|---|
| sbbb bbbb bbbb bbbb bbbb bbbb bbbb bbbb | | sbbb bbbb bbbb bbbb bbbb bbbb bbbb bbbb |

Signed packed doubleword in-register representation 515

FIG. 5c

| 127 | 64 63 | 0 |
|---|---|---|
| bbbb ... bbbb bbbb bbbb | | bbbb ... bbbb bbbb bbbb |

Unsigned packed quadword in-register representation 516

| 127 | 64 63 | 0 |
|---|---|---|
| sbbb ... bbbb bbbb bbbb | | sbbb ... bbbb bbbb bbbb |

Signed packed quadword in-register representation 517

FIG. 5d

METHOD AND APPARATUS FOR PERFORMING MULTIPLY-ADD OPERATIONS ON PACKED BYTE DATA

RELATED APPLICATIONS

This is a continuation-in-part application claiming, under 35 U.S.C. § 120, the benefit of the filing date of U.S. application Ser. No. 09/952,891, filed Oct. 29, 2001, now U.S. Pat. No. 7,085,795.

FIELD OF THE DISCLOSURE

This disclosure relates generally to the field of processors. In particular, the disclosure relates to Single-Instruction-Multiple-Data (SIMD) operations.

BACKGROUND OF THE DISCLOSURE

In typical computer systems, processors are implemented to operate on values represented by a large number of bits (e.g., 64) using instructions that produce one result. For example, the execution of an add instruction will add together a first 64-bit value and a second 64-bit value and store the result as a third 64-bit value. However, multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data which may be represented in a small number of bits. For example, graphical data typically requires 8 or 16 bits and sound data typically requires 8 or 16 bits. Each of these multimedia applications requires one or more algorithms, each requiring a number of operations. For example, an algorithm may require an add, compare and shift operation.

To improve efficiency of multimedia applications (as well as other applications that have the same characteristics), prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions. In this manner, these processors can more efficiently process multimedia applications.

However, if the loop of operations contains an operation that cannot be performed by the processor on packed data (i.e., the processor lacks the appropriate instruction), the data will have to be unpacked to perform the operation. For example, if the multimedia algorithm requires an add operation and the previously described packed add instruction is not available, the programmer must unpack both the first packed data and the second packed data (i.e., separate the elements comprising both the first packed data and the second packed data), add the separated elements together individually, and then pack the results into a packed result for further packed processing. The processing time required to perform such packing and unpacking often negates the performance advantage for which packed data formats are provided. Therefore, it is desirable to incorporate in a computer system a set of packed data instructions that provide all the required operations for typical multimedia algorithms. However, due to the limited die area on today's general purpose microprocessors, the number of instructions which may be added is limited. Therefore, it is desirable to invent instructions that provide both versatility (i.e. instructions which may be used in a wide variety of multimedia algorithms) and the greatest performance advantage.

One prior art technique for providing operations for use in multimedia algorithms is to couple a separate digital signaling processor (DSP) to an existing general purpose processor (e.g., The Intel® 486 manufactured by Intel Corporation of Santa Clara, Calif.). The general purpose processor allocates jobs that can be performed using packed data (e.g., video processing) to the DSP.

One such prior art DSP includes a multiply accumulate instruction that adds to an accumulation value the results of multiplying together two values. (see Kawakami, Yuichi, et al., "A Single-Chip Digital Signal Processor for Voiceband Applications", IEEE International Solid-State Circuits Conference, 1980, pp. 40-41). An example of the multiply accumulate operation for this DSP is shown below in Table 1, where the instruction is performed on the data values $A_1$ and $B_1$ accessed as Source1 and Source2, respectively.

TABLE 1

| Multiply-Accumulate Source1, Source2 | |
|---|---|
| $A_1$ | Source1 |
| $B_1$ | Source2 |
| $A_1 B_1$ + Accumulation Value | Result1 |

One limitation of this prior art instruction is its limited efficiency—i.e., it only operates on 2 values and an accumulation value. For example, to multiply and accumulate two sets of 2 values requires the following 2 instructions performed serially: 1) multiply accumulate the first value from the first set, the first value from the second set, and an accumulation value of zero to generate an intermediate accumulation value; 2) multiply accumulate the second value from the first set, the second value from the second set, and the intermediate accumulation value to generate the result.

Another prior art DSP includes a multiply accumulate instruction that operates on two sets of two values and an accumulation value (See "Digital Signal Processor with Parallel Multipliers", U.S. Pat. No. 4,771,379—referred to herein as the "Ando et al." reference). An example of the multiply accumulate instruction for this DSP is shown below in Table 2, where the instruction is performed on the data values $A_1, A_2, B_1$ and $B_2$ accessed as Source1 -4, respectively.

TABLE 2

| Source1 | | | |
|---|---|---|---|
| $A_1$ | | | $A_2$ |
| | Multiply Accumluate | | |
| Source2 | | | Source4 |
| $B_1$ | | | $B_2$ |
| | | = | Result1 |
| $A_1 \cdot B_1 + A_2 \cdot B_2$ + Accumulation Value | | | |

Using this prior art technique, two sets of 2 values are multiplied and then added to an accumulation value in one instruction.

This multiply accumulate instruction has limited versatility because it always adds to the accumulation value. As a result, it is difficult to use the instruction for operations other than multiply accumulate. For example, the multiplication of complex numbers is commonly used in multimedia applications. The multiplication of two complex number (e.g., $r_1\ i_1$ and $r_2\ i_2$) is performed according to the following equation:

Real Component=$r_1 \cdot r_2 - i_1 \cdot i_2$

Imaginary Component=$r_1 \cdot i_2 + r_2 \cdot i_1$

This prior art DSP cannot perform the function of multiplying together two complex numbers using one multiply accumulate instruction.

The limitations of this multiply accumulate instruction can be more clearly seen when the result of such a calculation is needed in a subsequent multiplication operation rather than an accumulation. For example, if the real component were calculated using this prior art DSP, the accumulation value would need to be initialized to zero in order to correctly compute the result. Then the accumulation value would again need to be initialized to zero in order to calculate the imaginary component. To perform another complex multiplication on the resulting complex number and a third complex number (e.g., r3, i3), the resulting complex number must be rescaled and stored into the acceptable memory format and the accumulation value must again be initialized to zero. Then, the complex multiplication can be performed as described above. In each of these operations the ALU, which is devoted to the accumulation value, is superfluous hardware and extra instructions are needed to re-initialize this accumulation value. These extra instructions would otherwise have been unnecessary.

A further limitation of this prior art technique is that the data must be accessed through expensive multi-ported memory. This is because the multipliers are connected directly with data memories. Therefore the amount of parallelism which can be exploited is limited to a small number by the cost of the interconnection, and the fact that this interconnection is not decoupled from the instruction.

The Ando, et al. reference also describes that an alternative to this expensive interconnection is to introduce a delay for each subsequent pair of data to be multiplied. This solution diminishes any performance advantages to those provided by the solution previously shown in Table 1.

Furthermore, the notion of multi-ported memory or of pipelined accesses to memory entails the use of multiple addresses. This explicit use of one address per datum, clearly demonstrates that the critical notion of packed data is not employed in this prior art.

BRIEF DESCRIPTION OF THE DRAWINGS

The present invention is illustrated by way of example and not limitation in the figures of the accompanying drawings.

FIGS. 4a-4b illustrate packed data-types according to alternative embodiments of the invention.

FIGS. 5a-5d illustrate in-register packed data representations according to alternative embodiments of the invention.

DETAILED DESCRIPTION

Figure 1A:
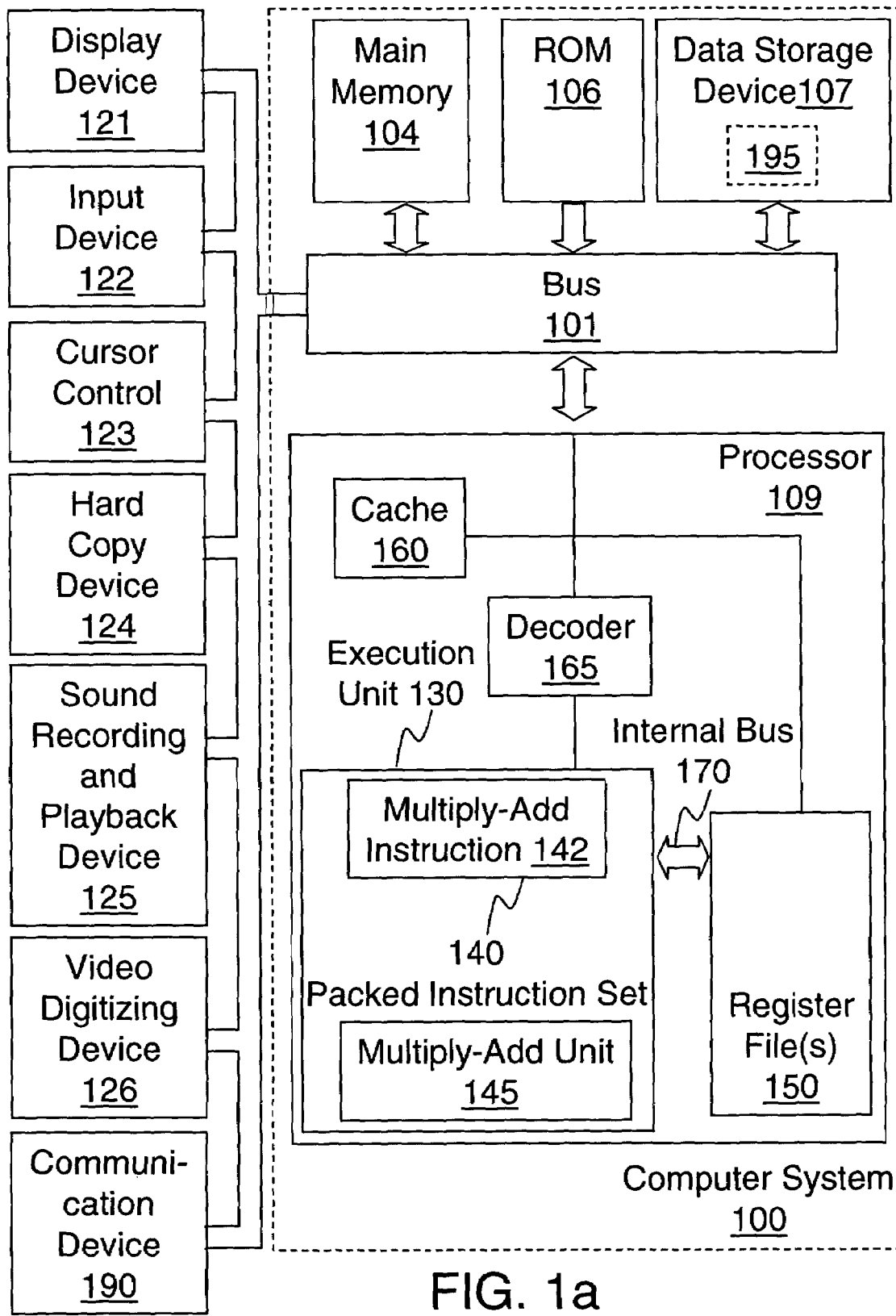
FIGS. 1a-1c illustrate exemplary computer systems according to alternative embodiments of the invention.

Disclosed herein is a method and apparatus for including in a processor, instructions for performing multiply-add operations on packed data. In one embodiment, a processor is coupled to a memory. The memory has stored therein a first packed data and a second packed data. The processor performs operations on data elements in the first packed data and the second packed data to generate a third packed data in response to receiving an instruction. At least two of the data elements in this third packed data storing the result of performing multiply-add operations on data elements in the first and second packed data.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Definitions

To provide a foundation for understanding the description of the embodiments of the invention, the following definitions are provided.

Bit X through Bit Y:
    defines a subfield of binary number. For example, bit six through bit zero of the byte $00111010_2$ (shown in base two) represent the subfield $111010_2$. The '2' following a binary number indicates base 2. Therefore, $1000_2$ equals $8_{10}$, while $F_{16}$ equals $15_{10}$.

$R_X$: is a register. A register is any device capable of storing and providing data. Further functionality of a register is described below. A register is not necessarily, included on the same die or in the same package as the processor..

SRC1, SRC2, and DEST:
    identify storage areas (e.g., memory addresses, registers, etc.)

Source1-i and Result1-i:
    represent data.

Overview

This application describes a method and apparatus for including in a processor instructions for performing multiply-add and multiply-subtract operations on packed data. In one embodiment, two multiply-add operations are performed using a single multiply-add instruction as shown below in Table 3a and Table 3b—Table 3a shows a simplified representation of one embodiment of the disclosed multiply-add instruction, while Table 3b shows a bit level example of an embodiment of the disclosed multiply-add instruction.

TABLE 3a

| Multiply-Add Source1, Source2 | | | | |
|---|---|---|---|---|
| $A_1$ | $A_2$ | $A_3$ | $A_4$ | Source1 |
| $B_1$ | $B_2$ | $B_3$ | $B_4$ | Source2 |
| = | | | | |
| $A_1B_1 + A_2B_2$ | | $A_3B_3 + A_4B_4$ | | Result1 |

TABLE 3b

| 11111111 11111111 11111111 00000000 | 01110001 11000111 01110001 11000111 |
|---|---|
| 3  2 | 1  0 |
| MULTIPLY  MULTIPLY | MULTIPLY  MULTIPLY |
| 00000000 00000000 00000000 00000001 | 10000000 00000000 00000100 00000000 |
| 32-BIT  32-BIT | 32-BIT  32-BIT |
| INTERMEDIATE INTERMEDIATE | INTERMEDIATE INTERMEDIATE |
| RESULT 4  RESULT 3 | RESULT 2  RESULT 1 |
| Add | Add |
| 11111111 11111111 11111111 00000000 | 11001000 11100011 10011100 00000000 |
| 1 | 0 |

Thus, the described embodiment of the multiply-add instruction multiplies together corresponding 16-bit data elements of Source1 and Source2 generating four 32-bit intermediate results. These 32-bit intermediate results are summed by pairs producing two 32-bit results that are packed into their respective elements of a packed result. As further described later, alternative embodiment may vary the number of bits in the data elements, intermediate results, and results. In addition, alternative embodiment may vary the number of data elements used, the number of intermediate results generated, and the number of data elements in the resulting packed data. For example alternative embodiments may include but are not limited to: a multiply-add instruction for an unsigned first source and a signed second source; a multiply-add instruction for an unsigned first source and an unsigned second source; and a multiply-add instruction for a signed first source and a signed second source. In each of the examples, said first and second sources may contain 8-bit data or 16-bit data or 32-bit data, and said first and second sources may comprise at least 64-bits of combined packed data or at least 128 bits of combined packed data, etc.

The multiply-subtract operation is the same as the multiply-add operation, except the adds are replaced with subtracts. The operation of an example multiply-subtract instruction is shown below in Table 4.

TABLE 4

| Multiply-Subtract Source1, Source2 | | | | |
|---|---|---|---|---|
| $A_1$ | $A_2$ | $A_3$ | $A_4$ | Source1 |
| $B_1$ | $B_2$ | $B_3$ | $B_4$ | Source2 |
| = | | | | |
| $A_1B_1 - A_2B_2$ | | $A_3B_3 - A_4B_4$ | | Result1 |

Of course, alternative embodiments may implement variations of these instructions. For example, alternative embodiments may include an instruction which performs at least one multiply-add operation or at least one multiply-subtract operation. As another example, alternative embodiments may include an instruction which performs at least one multiply-add operation in combination with at least one multiply-subtract operation. As another example, alternative embodiments may include an instruction which perform multiply-add operation(s) and/or multiply-subtract operation(s) in combination with some other operation.

Computer System

FIG. 1a illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1a also illustrates that processor 109 includes an execution unit 130, a register file 150, a cache 160, a decoder 165, and an internal bus 170. Of course, processor 109 contains additional circuitry which is not necessary to understanding the invention.

Execution unit 130 is used for executing instructions received by processor 109. In addition to recognizing instructions typically implemented in general purpose processors, execution unit 130 recognizes instructions in packed instruction set 140 for performing operations on packed data formats. Packed instruction set 140 includes instructions for supporting multiply-add and/or multiply-subtract operations. In addition, packed instruction set 140 may also include instructions for supporting a pack operation, an unpack operation, a packed add operation, a packed subtract operation, a packed multiply operation, a packed shift operation, a packed compare operation, a population count operation, and a set of packed logical operations (including packed AND, packed ANDNOT, packed OR, and packed XOR) as described in "A Set of Instructions for Operating on Packed Data," filed on Aug. 31, 1995, application Ser. No. 521,360. Packed instruction set 140 may also include one or more instructions for supporting: a move data operation; a data shuffle operation for organizing data within a data storage device; an adjacent-add instruction for adding adjacent bytes, words and doublewords, two word values, two words to produce a 16-bit result, two quadwords to produce a quadword result; and a register merger operation as are described in "An Apparatus and Method for Efficient Filtering and Convolution of Content Data," filed on Oct. 29, 2001, application Ser. No. 09/952,891.

Execution unit 130 is coupled to register file 150 by internal bus 170. Register file 150 represents a storage area on processor 109 for storing information, including data. It is understood that one aspect of the invention is the described instruction set for operating on packed data. According to this aspect of the invention, the storage area used for storing the packed data is not critical. However, embodiments of the register file 150 are later described with reference to FIGS. 2a-2b. Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc. Decoder 165 may be implemented using any number of different mechanisms (e.g., a look-up table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

FIG. 1a additionally shows a data storage device 107 (e.g., a magnetic disk, optical disk, and/or other machine readable media) can be coupled to computer system 100. In addition, the data storage device 107 is shown including code 195 for execution by the processor 109. The code 195 can be written to cause the processor 109 to perform transformations, filters or convolutions with the multiply-add/subtract instruction(s) for any number of purposes (e.g., motion video compression/decompression, image filtering, audio signal compression, filtering or synthesis, modulation/demodulation, etc.). Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer network. Computer system 100 optionally includes video digitizing device 126 and/or a communications device 190 (e.g., a serial communications chip, a wireless interface, an ethernet chip or a modem, which provides communications with an external device or network). Video digitizing device 126 can be used to capture video images that can be transmitted to others on the computer network.

In one embodiment, the processor 109 additionally supports an instruction set which is compatible with the ×86 instruction set used by existing processors (such as the Pentium® processor) manufactured by Intel Corporation of Santa Clara, Calif. Thus, in one embodiment, processor 109 supports all the operations supported in the IA™—Intel Architecture, as defined by Intel Corporation of Santa Clara, Calif. (see *Microprocessors,* Intel Data Books volume 1 and volume 2, 1992 and 1993, available from Intel of Santa Clara, Calif.). As a result, processor 109 can support existing ×86 operations in addition to the operations of the invention. Processor 109 may also be suitable for manufacture in one or more process technologies and by being represented on a machine readable media in sufficient detail, may be suitable to facilitate said manufacture. While the invention is described as being incorporated into an ×86 based instruction set, alternative embodiments could incorporate the invention into other instruction sets. For example, the invention could be incorporated into a 64-bit processor using a new instruction set.

Figure 1B:
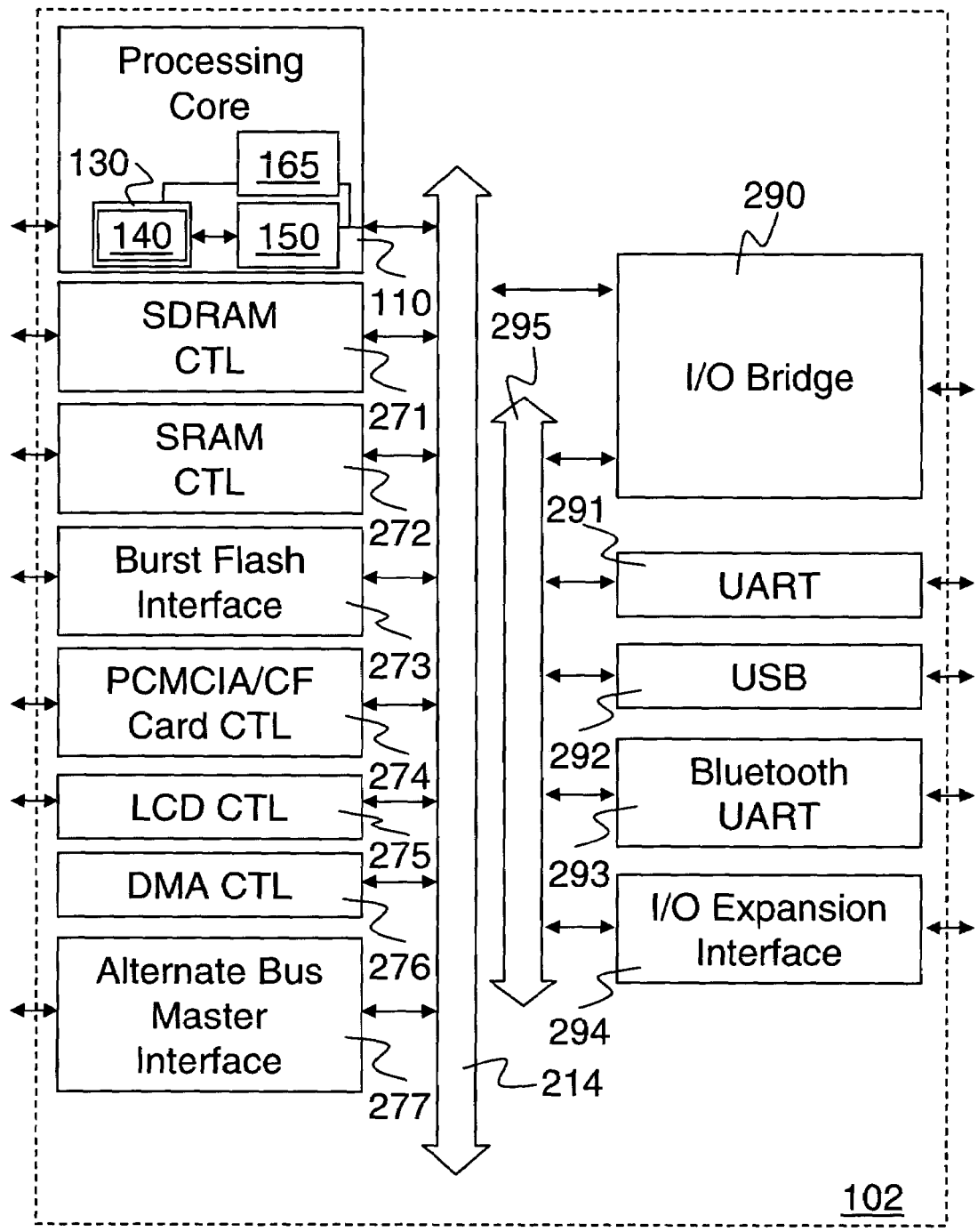

FIG. 1b illustrates an alternative embodiment of a data processing system 102 which implements the principles of the present invention. One embodiment of data processing system 102 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 102 comprises a processing core 110 capable of performing SIMD operations including multiplications and horizontal additions and/or subtractions. For one embodiment, processing core 110 represents a processing unit of any type of architecture, including but not limited to a CISC, a RISC or a VLIW type architecture. Processing core 110 may also be suitable for manufacture in one or more process technologies and by being represented on a machine readable media in sufficient detail, may be suitable to facilitate said manufacture.

Processing core 110 comprises an execution unit 130, a set of register file(s) 150, and a decoder 165. Processing core 110 also includes additional circuitry (not shown) which is not necessary to the understanding of the present invention.

Execution unit 130 is used for executing instructions received by processing core 110. In addition to recognizing typical processor instructions, execution unit 220 recognizes instructions in packed instruction set 140 for performing operations on packed data formats. Packed instruction set 140 includes instructions for supporting multiply-add/subtract operations, and may also include other packed instructions.

Execution unit 130 is coupled to register file 150 by an internal bus. Register file 150 represents a storage area on processing core 110 for storing information, including data. As previously mentioned, it is understood that the storage area used for storing the packed data is not critical. Execution unit 130 is coupled to decoder 165. Decoder 165 is used for decoding instructions received by processing core 110 into control signals and/or microcode entry points. In response to these control signals and/or microcode entry points, execution unit 130 performs the appropriate operations.

Processing core 110 is coupled with bus 214 for communicating with various other system devices, which may include but are not limited to, for example, synchronous dynamic random access memory (SDRAM) control 271, static random access memory (SRAM) control 272, burst flash memory interface 273, personal computer memory card international association (PCMCIA)/compact flash (CF) card control 274, liquid crystal display (LCD) control 275, direct memory access (DMA) controller 276, and alternative bus master interface 277.

In one embodiment, data processing system 102 may also comprise an I/O bridge 290 for communicating with various I/O devices via an I/O bus 295. Such I/O devices may include but are not limited to, for example, universal asynchronous receiver/transmitter (UART) 291, universal serial bus (USB) 292, Bluetooth wireless UART 293 and I/O expansion interface 294.

One embodiment of data processing system 102 provides for mobile, network and/or wireless communications and a processing core 110 capable of performing SIMD operations including intra-addition and/or subtraction. Processing core 110 may be programmed with various audio, video, imaging and communications algorithms including discrete transformations, filters or convolutions; compression/decompression techniques such as color space transformation, video encode motion estimation or video decode motion compensation; and modulation/demodulation (MODEM) functions such as pulse coded modulation (PCM).

Figure 1C:
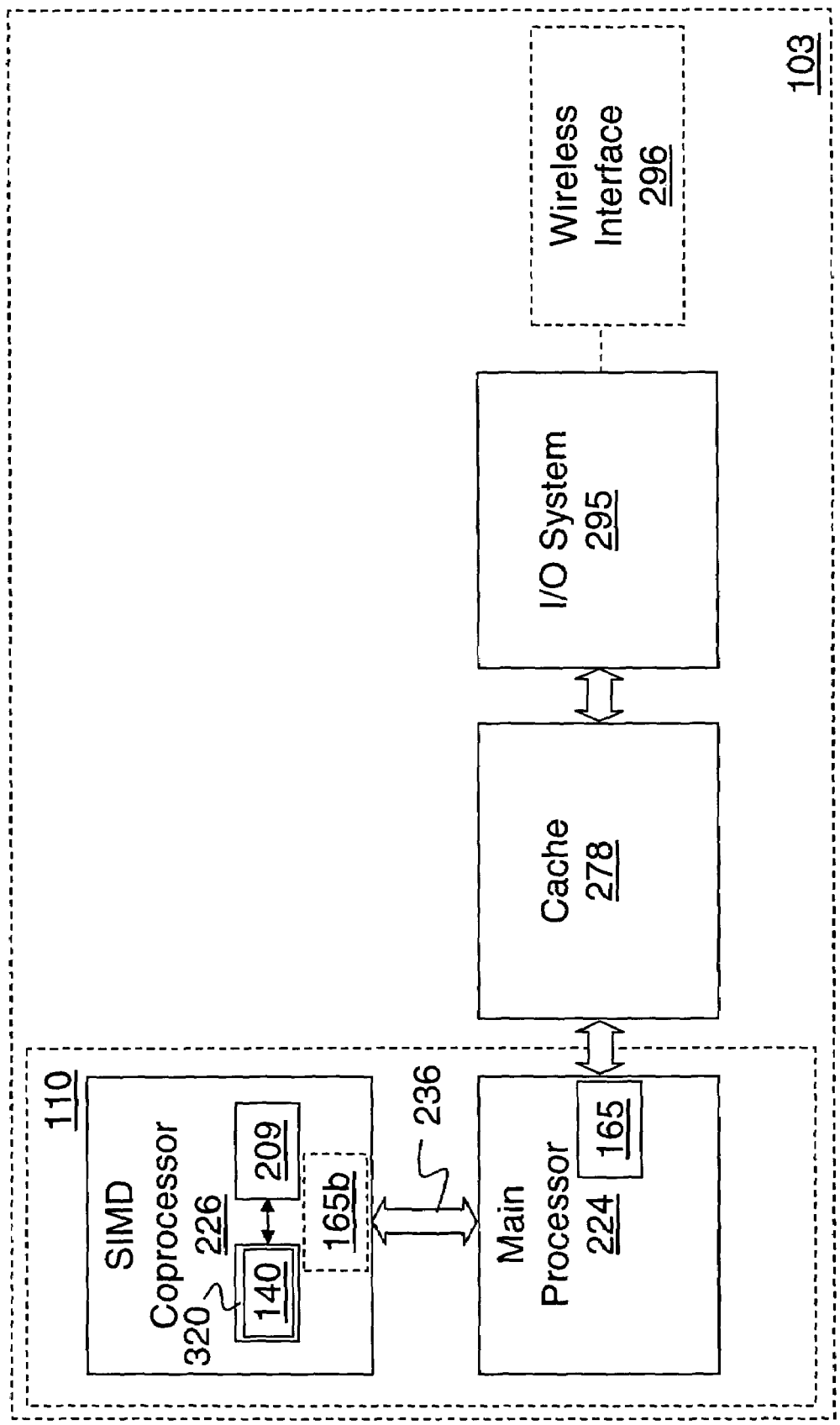

FIG. 1c illustrates alternative embodiments of a data processing system 103 capable of performing SIMD intra-addition/subtraction operations. In accordance with one alternative embodiment, data processing system 103 may include a main processor 224, a SIMD coprocessor 226, a cache memory 278 and an input/output system 265. The input/output system 295 may optionally be coupled to a wireless interface 296. SIMD coprocessor 226 is capable of performing SIMD operations including multiply-add/subtract operations. Processing core 110 may be suitable for manufacture in one or more process technologies and by being represented on a machine readable media in sufficient detail, may be suitable to facilitate the manufacture of all or part of data processing system 103 including processing core 110.

For one embodiment, SIMD coprocessor 226 comprises an execution unit 130 and register file(s) 209. One embodiment of main processor 224 comprises a decoder 165 to recognize instructions of instruction set 140 including SIMD multiply-add/subtract instructions for execution by execution unit 130. For alternative embodiments, SIMD coprocessor 226 also comprises at least part of decoder 165b to decode instructions of instruction set 140. Processing core 110 also includes additional circuitry (not shown) which is not necessary to the understanding of the present invention.

In operation, the main processor 224 executes a stream of data processing instructions that control data processing operations of a general type including interactions with the cache memory 278, and the input/output system 295. Embedded within the stream of data processing instructions are SIMD coprocessor instructions. The decoder 165 of main processor 224 recognizes these SIMD coprocessor instructions as being of a type that should be executed by an attached SIMD coprocessor 226. Accordingly, the main processor 224 issues these SIMD coprocessor instructions (or control signals representing SIMD coprocessor instructions) on the coprocessor bus 236 where from they are received by any attached SIMD coprocessors. In this case, the SIMD coprocessor 226 will accept and execute any received SIMD coprocessor instructions intended for it.

Data may be received via wireless interface 296 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames.

For one embodiment of processing core 110, main processor 224 and a SIMD coprocessor 226 are integrated into a single processing core 110 comprising an execution it 130, register file(s) 209, and a decoder 165 to recognize instructions of instruction set 140 including SIMD multiply-add/subtract instructions for execution by execution unit 130.

Figure 2A:
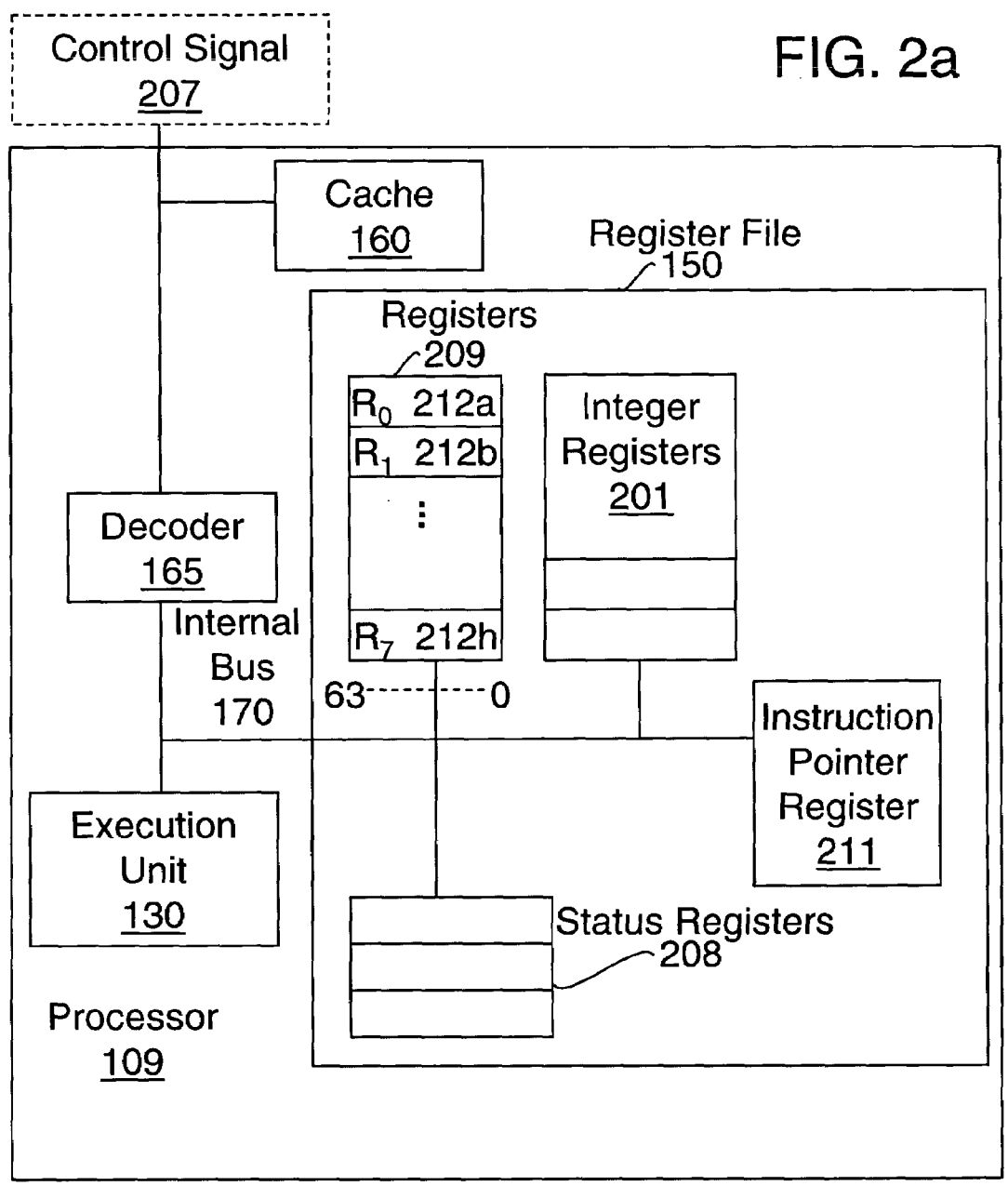
FIGS. 2a-2b illustrate register files of processors according to alternative embodiments of the invention.

FIG. 2a illustrates the register file of the processor according to one embodiment of the invention. The register file 150 may be used for storing information, including control/status information, integer data, floating point data, and packed data. In the embodiment shown in FIG. 2a, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Additional registers may also be coupled to internal bus 170.

In one embodiment, the registers 209 are used for both packed data and floating point data. In one such embodiment, the processor 109, at any given time, must treat the registers 209 as being either stack referenced floating point registers or non-stack referenced packed data registers. In this embodiment, a mechanism is included to allow the processor 109 to switch between operating on registers 209 as stack referenced floating point registers and non-stack referenced packed data registers. In another such embodiment, the processor 109 may simultaneously operate on registers 209 as non-stack referenced floating point and packed data registers. As another example, in another embodiment, these same registers may be used for storing integer data.

Of course, alternative embodiments may be implemented to contain more or less sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contains eight registers, $R_0$ 212a through $R_7$ 212h. $R_1$ 212a, $R_2$ 212b and $R_3$ 212c are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209. In another alternative embodiment, the registers 209 each contain 64 bits and registers 209 contains sixteen registers. In yet another alternative embodiment, registers 209 contains thirty-two registers.

Figure 2B:
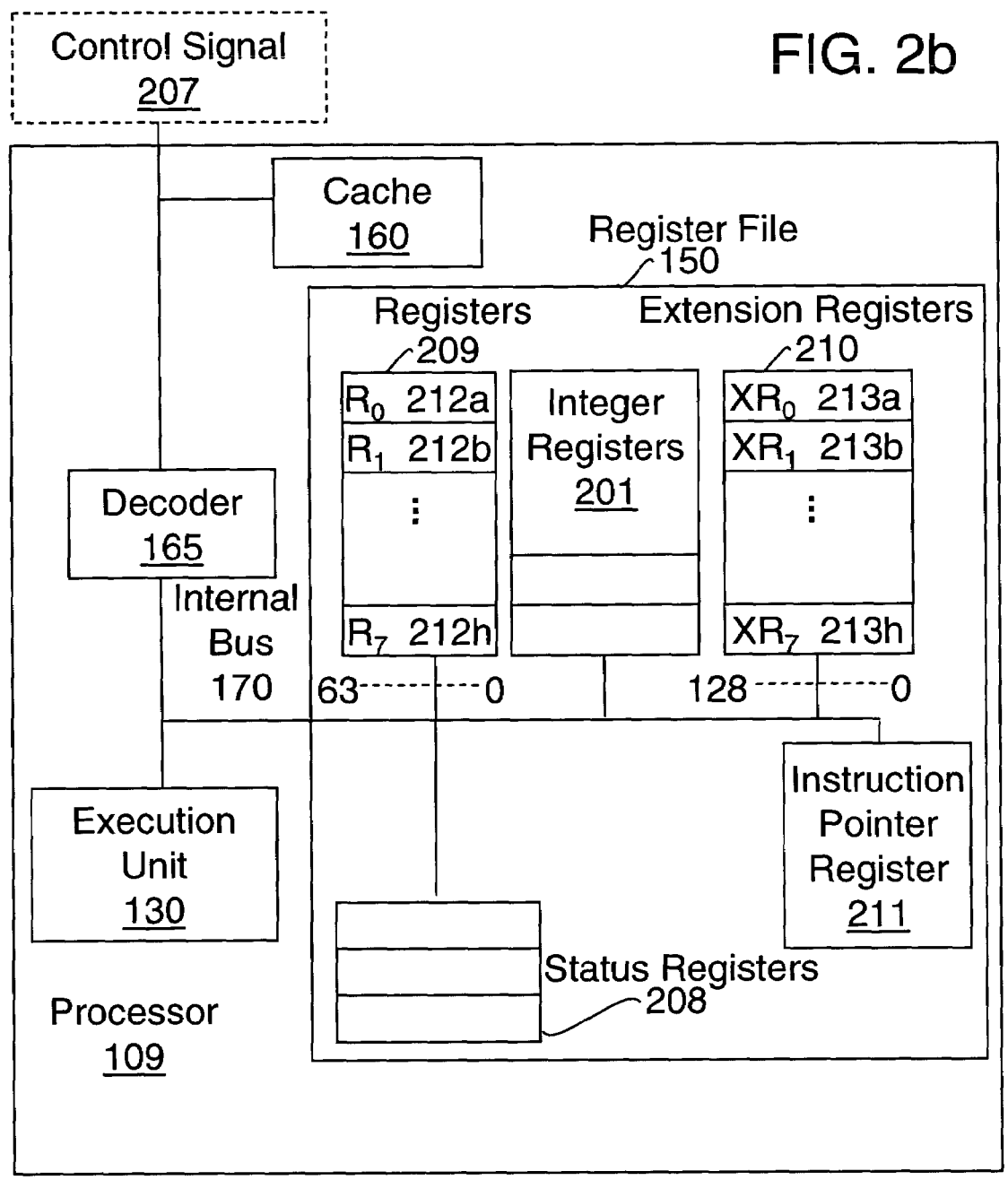

FIG. 2b illustrates the register file of the processor according to one alternative embodiment of the invention. The register file 150 may be used for storing information, including control/status information, integer data, floating point data, and packed data. In the embodiment shown in FIG. 2b, the register file 150 includes integer registers 201, registers 209, status registers 208, extension registers 210, and instruction pointer register 211. Status registers 208, instruction pointer register 211, integer registers 201, registers 209, are all coupled to internal bus 170. Additionally, extension registers 210 are also coupled to internal bus 170.

In one embodiment, the extension registers 210 are used for both packed integer data and packed floating point data. In alternative embodiments, the extension registers 210 may be used for scalar data, packed Boolean data, packed integer data and/or packed floating point data. Of course, alternative embodiments may be implemented to contain more or less sets of registers, more or less registers in each set or more or less data in each register without departing from the broader scope of the invention.

In one embodiment, the integer registers 201 are implemented to store thirty-two bits, the registers 209 are implemented to store eighty bits (all eighty bits are used for storing floating point data, while only sixty-four are used for packed data) and the extension registers 210 are implemented to store 128 bits. In addition, extension registers 210 may contain eight registers, $XR_0$ 213a through $XR_7$ 213h. $XR_1$ 213a, $XR_2$ 213b and $R_3$ 213c are examples of individual registers in registers 210. In another embodiment, the integer registers 201 each contain 64 bits, the registers 210 each contain 64 bits and registers 210 contains sixteen registers. In one embodiment two registers of registers 210 may be operated upon as a pair. In yet another alternative embodiment, registers 210 contains thirty-two registers.

Figure 3:
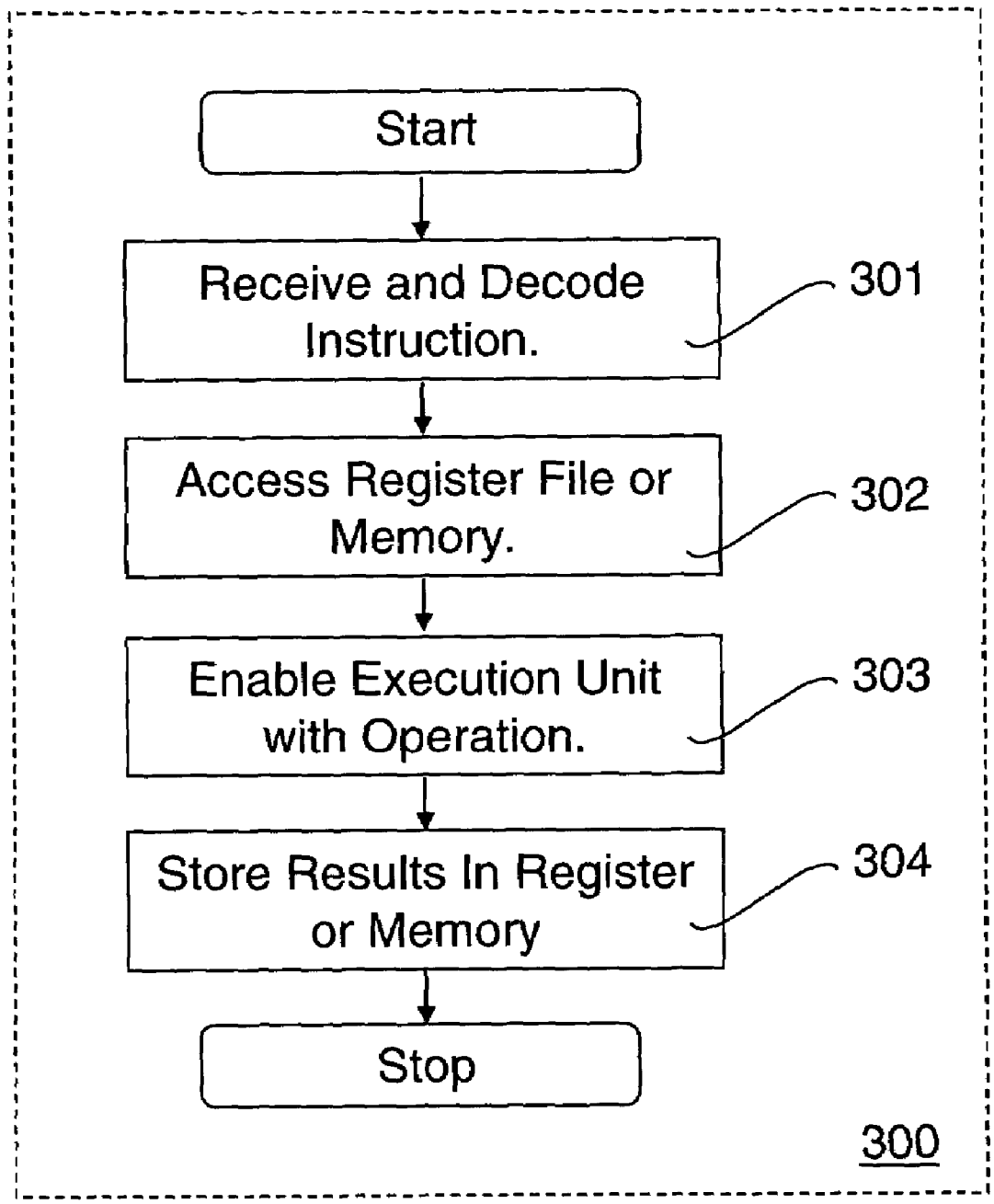
FIG. 3 illustrates a flow diagram for one embodiment of a process used by the processor to manipulate data.

FIG. 3 illustrates a flow diagram for one embodiment of a process 300 to manipulate data according to one embodiment of the invention. That is, FIG. 3 illustrates the a process followed, for example, by processor 109 while performing an operation on packed data, performing an operation on unpacked data, or performing some other operation. Process 300 and other processes herein disclosed are performed by processing blocks that may comprise dedicated hardware or software or firmware operation codes executable by general purpose machines or by special purpose machines or by a combination of both.

In processing block 301, the decoder 165 receives a control signal from either the cache 160 or bus 101. Decoder 165 decodes the control signal to determine the operations to be performed.

In processing block 302, Decoder 165 accesses the register file 150, or a location in memory. Registers in the register file 150, or memory locations in the memory, are accessed depending on the register address specified in the control signal. For example, for an operation on packed data, the control signal can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIGS. 6a-6d. The data stored in the corresponding registers is referred to as Source1, Source2, and Result respectively. In one embodiment, each of these data may be sixty-four bits in length. In an alternative embodiment, these data may be sixty-four or one hundred twenty-eight bits in length.

In another embodiment of the invention, any one, or all, of SRC1, SRC2 and DEST, can define a memory location in the addressable memory space of processor 109 or processing core 110. For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, these accesses could be made to memory instead.

In processing block 303, execution unit 130 is enabled to perform the operation on the accessed data. In processing block 304, the result is stored back into register file 150 according to requirements of the control signal.

Data Storage Formats

Figure 4A:
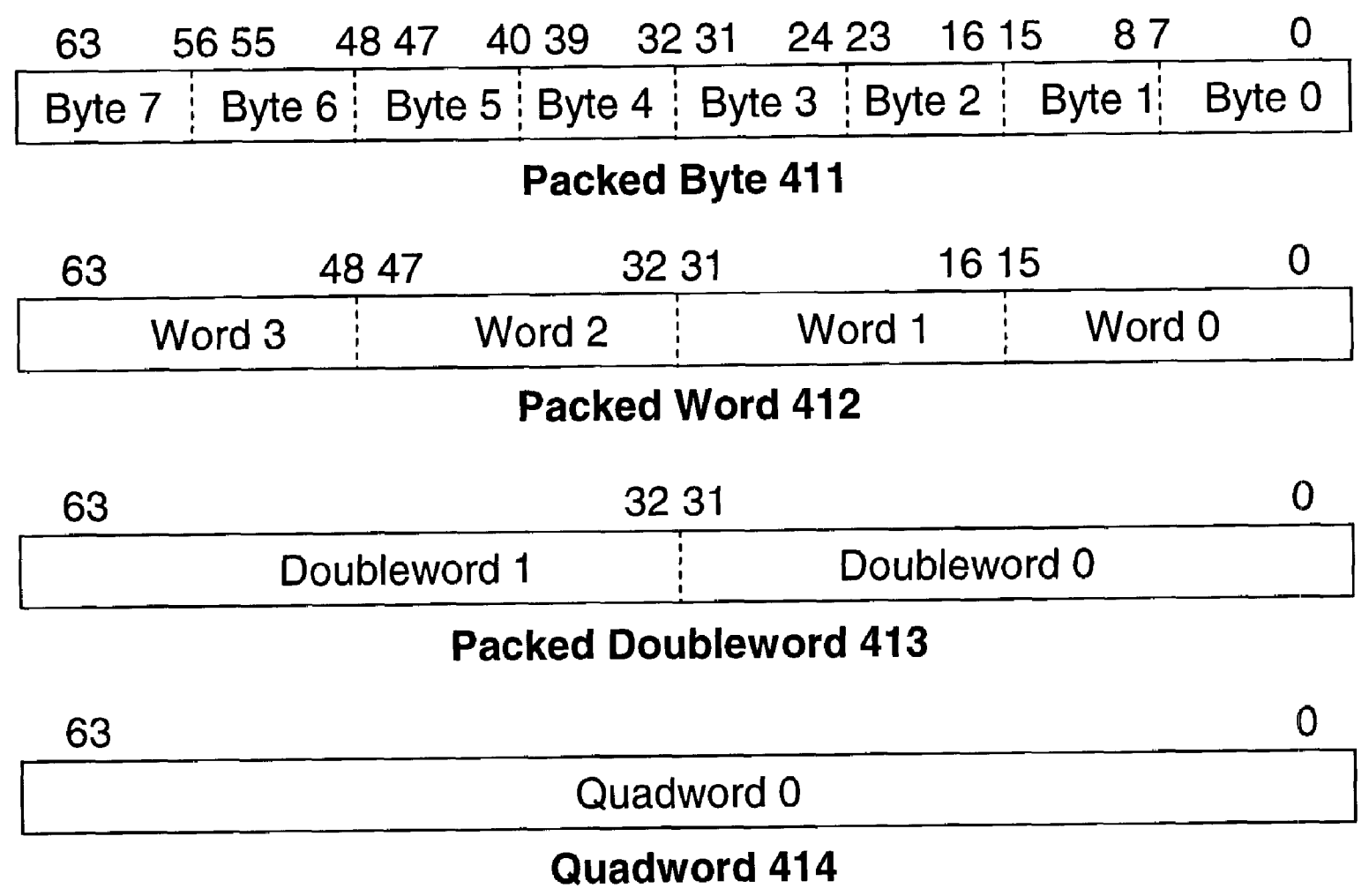

FIG. 4a illustrates packed data-types according to one embodiment of the invention. Three packed data formats are illustrated; packed byte 411, packed word 412, and packed doubleword 413. Packed byte, in one embodiment of the invention, is sixty-four bits long containing eight data elements. In an alternative embodiment, packed byte may be sixty-four or one hundred twenty-eight bits long containing eight or sixteen data elements. Each data element is one byte long. Generally, a data element is an individual piece of data that is stored in a single register (or memory location) with other data elements of the same length. In one embodiment of the invention, the number of data elements stored in a register is sixty-four bits or one hundred twenty-eight bits divided by the length in bits of a data element.

Packed word 412 may be sixty-four or one hundred twenty-eight bits long and contains four or eight word 412 data elements. Each word 412 data element contains sixteen bits of information.

Packed doubleword 413 may be sixty-four or one hundred twenty-eight bits long and contains two or four doubleword 413 data elements. Each doubleword 413 data element contains thirty-two bits of information.

FIG. 4a also illustrates a quadword 414 data-type according to one embodiment of the invention. Each quadword 414 data element contains sixty-four bits of information.

FIG. 4b illustrates packed data-types according to one alternative embodiment of the invention. Four packed data formats are illustrated; packed byte 421, packed half 422, packed single 423 and packed double 424. Packed byte, in one embodiment of the invention, is one hundred twenty-eight bits long containing sixteen data elements. In an alternative embodiment, packed byte may be sixty-four or one hundred twenty-eight bits long containing eight or sixteen data elements. Each data element is one byte long.

Packed half 422 may be sixty-four or one hundred twenty-eight bits long and contains four or eight half 422 data elements. Each half 422 data element contains sixteen bits of information.

Packed single 423 may be sixty-four or one hundred twenty-eight bits long and contains two or four single 423 data elements. Each single 423 data element contains thirty-two bits of information.

Packed double 424 may be sixty-four or one hundred twenty-eight bits long and contains one or two double 424 data elements. Each double 424 data element contains sixty-four bits of information.

In one embodiment of the invention, packed single 423 and packed double 424 may be packed floating point data elements. In an alternative embodiment of the invention, packed single 423 and packed double 424 may be packed integer, packed Boolean or packed floating point data elements. In another alternative embodiment of the invention, packed byte 421, packed half 422, packed single 423 and packed double 424 may be packed integer or packed Boolean data elements. In alternative embodiments of the invention, not all of the packed byte 421, packed half 422, packed single 423 and packed double 424 data formats may be permitted.

FIGS. 5a-5d illustrate the in-register packed data storage representation according to one embodiment of the invention. Unsigned packed byte in-register representation 510 illustrates the storage of an unsigned packed byte, for example in one of the registers $R_0$ 212a through $R_7$ 212h or in half of one of the registers $XR_0$ 213a through $XR_7$ 213h. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 illustrates the storage of a signed packed byte. Note that the eighth bit of every byte data element is the sign indicator.

Unsigned packed word in-register representation 512 illustrates how word three through word zero are stored in one register of registers 209 or in half of a register of registers 210. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that the sixteenth bit of each word data element is the sign indicator.

Unsigned packed doubleword in-register representation 514 shows how registers 209 or registers 210, for example, store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

Unsigned packed quadword in-register representation 516 shows how registers 210 store two quadword data elements. Quadword zero is stored in bit sixty-three through bit zero of the register. Quadword one is stored in bit one hundred twenty-seven through bit sixty-four of the register. Signed packed quadword in-register representation 517 is similar to unsigned packed quadword in-register representation 516. Note that the necessary sign bit is the sixty-fourth bit of the quadword data element.

As mentioned previously, registers 209 may be used for both packed data and floating point data. In this embodiment of the invention, the individual programming processor 109 may be required to track whether an addressed register, $R_0$ 212a for example, is storing packed data or floating point data. In an alternative embodiment, processor 109 could track the type of data stored in individual registers of registers 209. This alternative embodiment could then generate errors if, for example, a packed addition operation were attempted on floating point data.

Operation Encoding Formats

Figure 6A:
FIGS. 6a-6d illustrate operation encoding (opcode) formats for indicating the use of packed data according to alternative embodiments of the invention.

Turning next to FIG. 6a, in some alternative embodiments, 64 bit single instruction multiple data (SIMD) arithmetic operations may be performed through a coprocessor data processing (CDP) instruction. Operation encoding (opcode) format 601 depicts one such CDP instruction having CDP opcode fields 611 and 618. The type of CDP instruction, for alternative embodiments of multiply-add/subtract operations, may be encoded by one or more of fields 612, 613, 616 and 617. Up to three operand locations per instruction may be identified, including up to two source operand identifiers SRC1 602 and SRC2 603 and one destination operand identifier DEST 605. One embodiment of the coprocessor can operate on 8, 16, 32, and 64 bit values. For one embodiment, the multiply-addition/subtraction is performed on fixed-point or integer data values. For alternative embodiments, multiply-addition/subtraction may be performed on floating-point data values. In some embodiments, the multiply-add/subtract instructions may be executed conditionally, using condition field 610. For some multiply-add/subtract instructions source data sizes may be encoded by field 612.

In some embodiments of the multiply-add/subtract instructions, Zero (Z), negative (N), carry (C), and overflow (V) detection can be done on SIMD fields. Also, signed saturation and/or unsigned saturation to the SIMD field width may be performed for some embodiments of multiply-add/subtract operations. In some embodiments of the multiply-add/subtract instructions in which saturation is enabled, saturation detection may also be done on SIMD fields. For some instructions, the type of saturation may be encoded by field 613. For other instructions, the type of saturation may be fixed.

Figure 6B:

FIG. 6b is a depiction of an alternative operation encoding (opcode) format 621, having twenty-four or more bits, and register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. The type of multiply-add/subtract operation, may be encoded by one or more of fields 622 and 624. Up to two operand locations per instruction may be identified, including up to two source operand identifiers SRC1 602 and SRC2 603. For one embodiment of the multiply-add/subtract instruction, destination operand identifier DEST 605 is the same as source operand identifier SRC1 602. For an alternative embodiment, destination operand identifier DEST 605 is the same as source operand identifier SRC2 603. Therefore, for embodiments of the multiply-add/subtract operations, one of the source operands identified by source operand identifiers SRC1 602 and SRC2 603 is overwritten by the results of the multiply-add/subtract operations. For one embodiment of the multiply-add/subtract instruction, operand identifiers SRC1 602 and SRC2 603 may be used to identify 64-bit source and destination operands.

Figure 6C:

FIG. 6c is a depiction of an alternative operation encoding (opcode) format 631, having thirty-two or more bits, and register/memory operand addressing modes. The type of multiply-add/subtract operation, may be encoded by one or more of fields 632 and 634 and up to two operand locations per instruction may be identified, including up to two source operand identifiers SRC1 602 and SRC2 603. For example, in one embodiment of the multiply-add instruction, field 632 may be set to a hexadecimal value of 0F38 and field 634 may be set to a hexadecimal value of 04 to indicate that data associated with source operand identifier SRC1 602 is to be treated as unsigned packed bytes, data associated with source operand identifier SRC2 603 is to be treated as signed packed bytes and result data associated with destination operand identifier DEST 605 is to be treated as signed packed words.

For one embodiment, destination operand identifier DEST 605 is the same as source operand identifier SRC1 602. For an alternative embodiment, destination operand identifier DEST 605 is the same as source operand identifier SRC2 603. For one embodiment of the multiply-add/subtract instruction, operand identifiers SRC1 602 and SRC2 603 of opcode format 631 may be used to identify 64-bit source and destination operands. For an alternative embodiment of the multiply-add/subtract instruction, operand identifiers SRC1 602 and SRC2 603 maybe used to identify 128-bit source and destination operands.

For one embodiment, opcode format 621, opcode format 631 and other opcode formats described in the "IA-32 Intel Architecture Software Developer's Manual Volume 2: Instruction Set Reference," (available from Intel Corporation, Santa Clara, Calif. on the world-wide-web at intel.com/design/litcentr) are each supported by decoder 165. In alternative embodiments of decoder 165, a plurality of instructions, each potentially having a different opcode format, may be decoded concurrently or in parallel. It will be appreciated that the decoding of opcode formats in a timely manner may be of critical importance to the performance of a processor such as processor 109. One of the unique requirements of decoding multiple opcode formats of variable lengths is determining precisely where each instruction begins. In order to accomplish this requirement, the lengths of each of the plurality of opcode formats must be determined.

For example, in one embodiment of opcode format 621, determining the length of an instruction requires examination of up to 27 bits from fields 622, 624, 626, 602, 603 and potentially from a 3-bit base field of an optional scale-index-base (SIB) byte (not shown), which is described in the "IA-32 Intel Architecture Software Developer's Manual Volume 2: Instruction Set Reference." It will be appreciated that, if determining the length of an instruction using opcode format 631 requires examination of more bits than determining the length of an instruction using opcode format 621, additional complexity and/or delays may be incurred.

For one embodiment of the multiply-add instruction, field 632 may be set to a hexadecimal value of 0F38, which may be used in a manner substantially similar to that of fields 622 in determining the length of an instruction. Further, when field 632 is set to the hexadecimal value of 0F38, field 634 may be ignored by decoder 165 in determining the length of the instruction, thereby requiring examination of no more than 27 bits from fields 632, 626, 602, 603 and potentially from the 3-bit base field of an optional SIB byte. Thus opcode format 631 may be implemented in such a way as to provide additional flexibility and diversity of instruction encodings and avoid introduction of unnecessary complexity and/or delays in decoder 165.

Figure 6D:

FIG. 6d is a depiction of another alternative operation encoding (opcode) format 641, having forty or more bits. Opcode format 641 corresponds with opcode format 631 and comprises an optional prefix byte 640. The type of multiply-add/subtract operation, may be encoded by one or more of fields 640, 632 and 634. Up to two operand locations per instruction may be identified by source operand identifiers SRC1 602 and SRC2 603 and by prefix byte 640. For one embodiment of the multiply-add/subtract instruction, prefix byte 640 may be used to identify 128-bit source and destination operands. For example, in one embodiment of the multiply-add instruction, prefix byte 640 may be set to a hexadecimal value of 66, to indicate that 128 bits of data from one of the extension registers 210 are associated with source operand identifiers SRC1 602 and SRC2 603 and 128 bits of result data from one of the extension registers 210 are associated with destination operand identifier DEST 605.

For one embodiment of the multiply-add/subtract instruction, destination operand identifier DEST 605 is the same as source operand identifier SRC1 602. For an alternative embodiment, destination operand identifier DEST 605 is the same as source operand identifier SRC2 603. Therefore, for embodiments of the multiply-add/subtract operations, one of the source operands identified by source operand identifiers SRC1 602 and SRC2 603 of opcode format 631 or opcode format 641 is overwritten by the results of the multiply-add/subtract operations.

Opcode formats 621, 631 and 641 allow register to register, memory to register, register by memory, register by register, register by immediate, register to memory addressing specified in part by MOD fields 626 and by optional scale-index-base and displacement bytes.

Description of Saturate/Unsaturate

As mentioned previously, in some embodiments multiply-add/subtract opcodes may indicate whether operations optionally saturate. In some alternative embodiments saturation may not be optional for a given multiply-add/subtract instruction. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 5.

TABLE 5

| Data Format | Minimum Value | Maximum Value |
| --- | --- | --- |
| Unsigned Byte | 0 | 255 |
| Signed Byte | −128 | 127 |
| Unsigned word | 0 | 65535 |
| Signed word | −32768 | 32767 |
| Unsigned Doubleword | 0 | $2^{32}-1$ |
| Signed Doubleword | $-2^{31}$ | $2^{31}-1$ |
| Unsigned Quadword | 0 | $2^{64}-1$ |
| Signed Quadword | $-2^{63}$ | $2^{63}-1$ |

Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Multiply-Add/Subtract Operation(s)

In one embodiment of the invention, the SRC1 register contains packed data (Source1), the SRC2 register contains packed data (Source2), and the DEST register will contain the result (Result) of performing the multiply-add or multiply-subtract instruction on Source1 and Source2. In the first step of the multiply-add and multiply-subtract instruction, Source1 will have each data element independently multiplied by the respective data element of Source2 to generate a set of respective intermediate results. These intermediate results are summed by pairs to generate the Result for the multiply-add instruction. In contrast, these intermediate results are subtracted by pairs to generate the Result for the multiply-subtract instruction.

In one embodiment of the invention, the multiply-add and multiply-subtract instructions operate on signed packed data and truncate the results to avoid any overflows. In addition, these instructions operate on packed word data and the Result is a packed double word. However, alternative embodiments could support these instructions for other packed data types. For example, an alternative embodiment may support the multiply-add or the multiply-subtract instructions on packed byte data wherein the Result is a packed word.

Figure 7A:
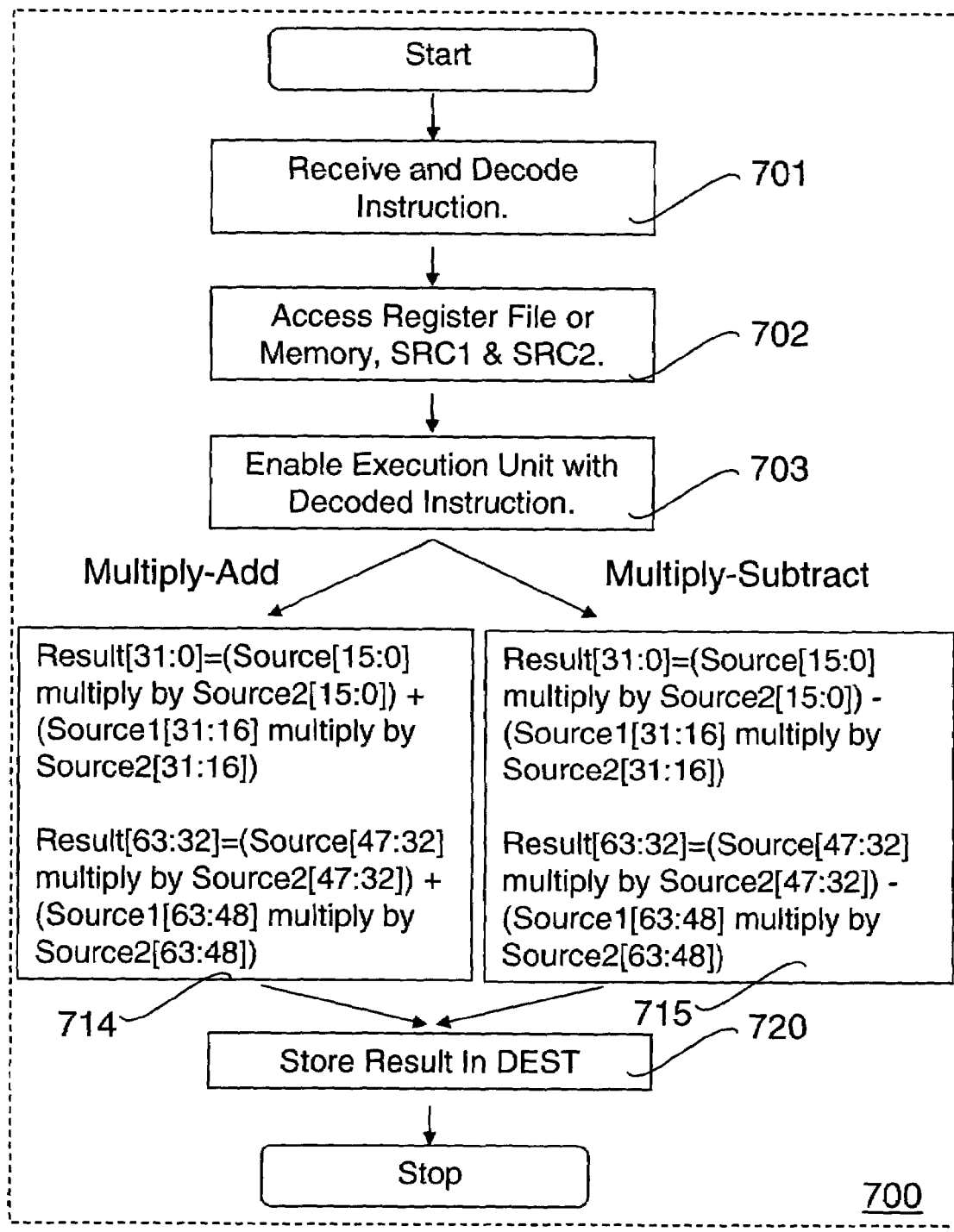
FIGS. 7a-7c illustrate flow diagrams for alternative embodiments of processes for performing multiply-add and multiply-subtract operations on packed data.

FIG. 7a is illustrates a flow diagram for one embodiment of a process 700 for performing multiply-add and multiply-subtract operations on packed data according to one embodiment of the invention. Process 700 and other processes herein disclosed are performed by processing blocks that may comprise dedicated hardware or software or firmware operation codes executable by general purpose machines or by special purpose machines or by a combination of both.

In processing block 701, decoder 165 decodes the control signal received by processor 109. Thus, decoder 165 decodes: the operation code for a multiply-add instruction or a multiply-subtract instruction.

In processing block 702, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). That is, registers 209 (or extension registers 210) communicate the packed data to execution unit 130 via internal bus 170.

In processing block 703, decoder 165 enables execution unit 130 to perform the instruction. If the instruction is a multiply-add instruction, flow passes to processing block 714. However, if the instruction is a multiply-subtract instruction, flow passes to processing block 715.

In processing block 714, the following is performed. Source1 bits fifteen through zero are multiplied by Source2 bits fifteen through zero generating a first 32-bit intermediate result (Intermediate Result 1). Source1 bits thirty-one through sixteen are multiplied by Source2 bits thirty-one through sixteen generating a second 32-bit intermediate result (Intermediate Result 2). Source1 bits forty-seven through thirty-two are multiplied by Source2 bits forty-seven through thirty-two generating a third 32-bit intermediate result (Intermediate Result 3). Source1 bits sixty-three through forty-eight are multiplied by Source2 bits sixty-three through forty-eight generating a fourth 32-bit intermediate result (Intermediate Result 4). Intermediate Result 1 is added to Intermediate Result 2 generating Result bits thirty-one through zero, and Intermediate Result 3 is added to Intermediate Result 4 generating Result bits sixty-three through thirty-two.

Processing block 715 is substantially the same as processing block 714, with the exception that Intermediate Result 1 and Intermediate Result 2 are subtracted to generate bits thirty-one through zero of the Result, and Intermediate Result 3 and Intermediate Result 4 are subtracted to generate bits sixty-three through thirty-two of the Result.

Different embodiments may perform the multiplies and adds/subtracts serially, in parallel, or in some combination of serial and parallel operations.

In processing block 720, the Result is stored in the DEST register.

It will be appreciated that alternative embodiments of process 700 may implement only processing block 714 and not processing block 715, or only processing block 715 and not processing block 714. It will also be appreciated that alternative embodiments of process 700 may implement additional processing blocks to support additional variations of the multiply-add or multiply-subtract instructions.

Figure 7B:
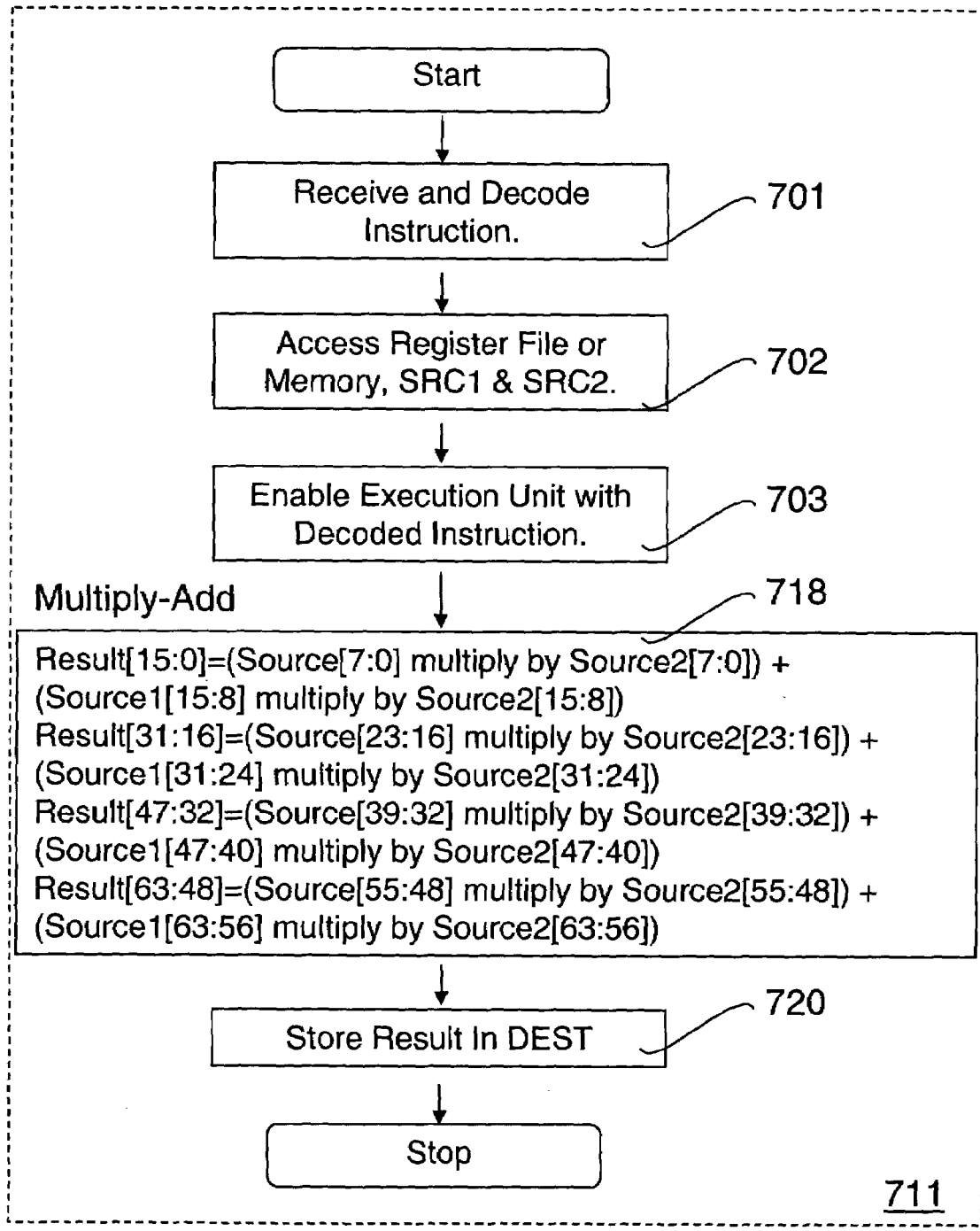

FIG. 7b illustrates a flow diagram for an alternative embodiment of a process 711 for a performing multiply-add operation on packed data. Processing blocks 701 through 703 are essentially the same as in process block 700, with the exception that in processing block 703, when decoder 165 enables execution unit 130 to perform the instruction, the instruction is a multiply-add instruction for performing byte multiplications having, for example, opcode format 631, and so flow passes to processing block 718.

In processing block 718, the following is performed. Source1 bits seven through zero are multiplied by Source2 bits seven through zero generating a first 16-bit intermediate result (Intermediate Result 1). Source1 bits fifteen through eight are multiplied by Source2 bits fifteen through eight generating a second 16-bit intermediate result (Intermediate Result 2). Source1 bits twenty-three through sixteen are multiplied by Source2 bits twenty-three through sixteen generating a third 16-bit intermediate result (Intermediate Result 3). Source1 bits thirty-one through twenty-four are multiplied by Source2 bits thirty-one through twenty-four generating a fourth 16-bit intermediate result (Intermediate Result 4). Source1 bits thirty-nine through thirty-two are multiplied by Source2 bits thirty-nine through thirty-two generating a fifth 16-bit intermediate result (Intermediate Result 5). Source1 bits forty-seven through forty are multiplied by Source2 bits forty-seven through forty generating a sixth 16-bit intermediate result (Intermediate Result 6). Source1 bits fifty-five through forty-eight are multiplied by Source2 bits fifty-five through forty-eight generating a seventh 16-bit intermediate result (Intermediate Result 7). Source1 bits sixty-three through fifty-six are multiplied by Source2 bits sixty-three through fifty-six generating an eighth 16-bit intermediate result (Intermediate Result 8). Intermediate Result 1 is added to intermediate Result 2 generating Result bits fifteen through zero, Intermediate Result 3 is added to Intermediate Result 4 generating Result bits thirty-one through sixteen, Intermediate Result 5 is added to Intermediate Result 6 generating Result bits forty-seven through thirty-two, and Intermediate Result 7 is added to Intermediate Result 8 generating Result bits sixty-three through forty-eight.

In processing block 720, the Result is stored in the DEST register.

Figure 7C:
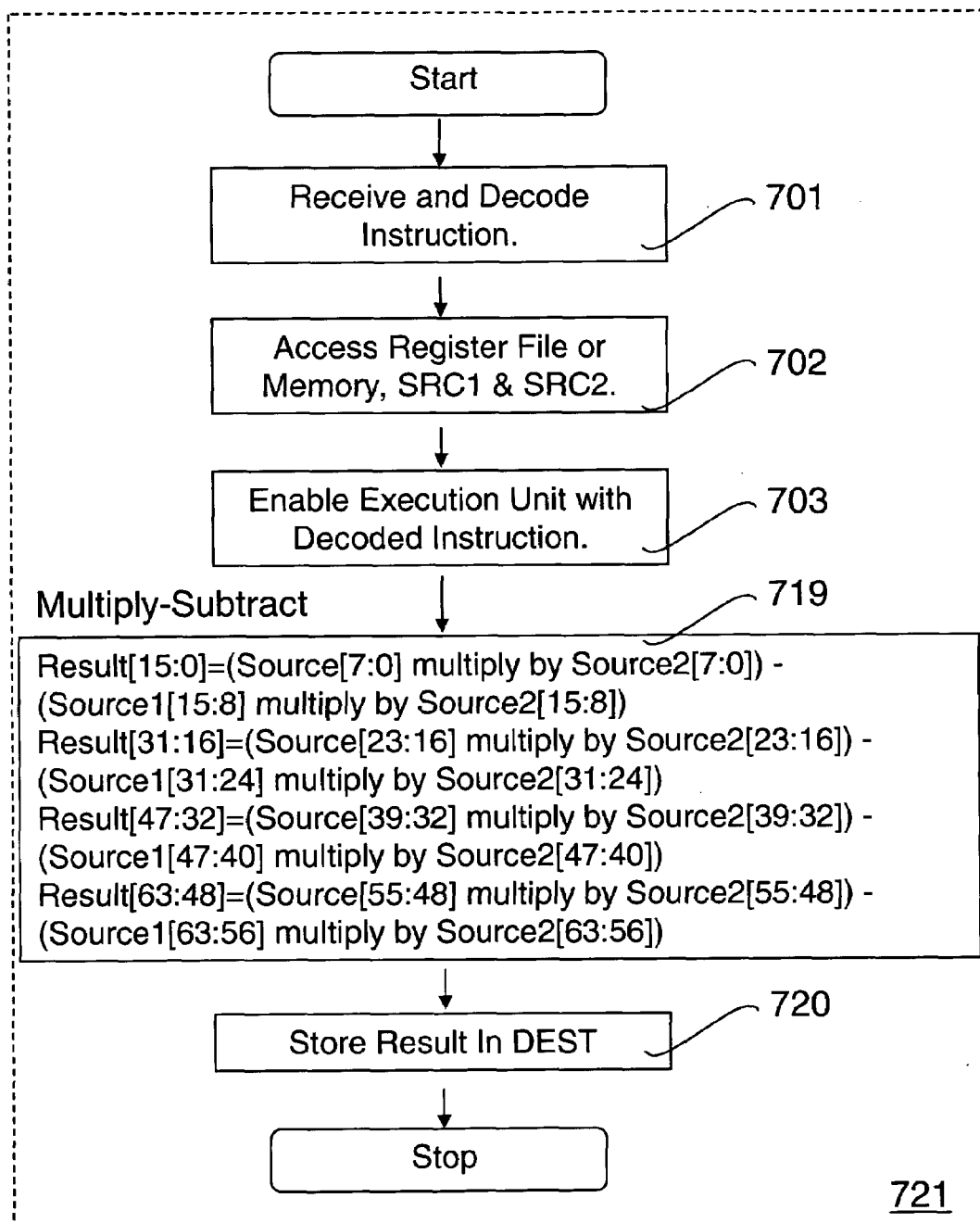

FIG. 7c illustrates a flow diagram for an alternative embodiment of a process 721 for performing multiply-subtract operation on packed data. Processing blocks 701 through 703 are essentially the same as in process block 711, with the exception that in processing block 703, the instruction is a multiply-subtract instruction for performing byte multiplications, and so flow passes to processing block 719.

In processing block 719, the multiplication operations are substantially the same as processing block 718, with the exception that Intermediate Result 1 and Intermediate Result 2 are subtracted to generate Result bits fifteen through zero, Intermediate Result 3 and Intermediate Result 4 are subtracted to generate Result bits thirty-one through sixteen, Intermediate Result 5 and Intermediate Result 6 are subtracted to generate Result bits forty-seven through thirty-two, and Intermediate Result 7 and Intermediate Result 8 are subtracted to generate Result bits sixty-three through forty-eight.

Again, in processing block 720, the Result is stored in the DEST register.

It will be appreciated that alternative embodiments of processing blocks 714, 715, 718 or 719 may perform multiplication operations on signed or unsigned data elements or on a combination of both. It will also be appreciated that alternative embodiments of processing blocks 714, 715, 718 or 719 may perform addition and/or subtraction operations with or without saturation on signed or unsigned intermediate results or on a combination of both.

Packed Data Multiply-Add/Subtract Circuits

In one embodiment, the multiply-add and multiply-subtract instructions can execute on multiple data elements in the same number of clock cycles as a single multiply on unpacked data. To achieve execution in the same number of clock cycles, parallelism may be used. That is, registers may be simultaneously instructed to perform the multiply-add/subtract operations on the data elements. This is discussed in more detail below.

Figure 8A:
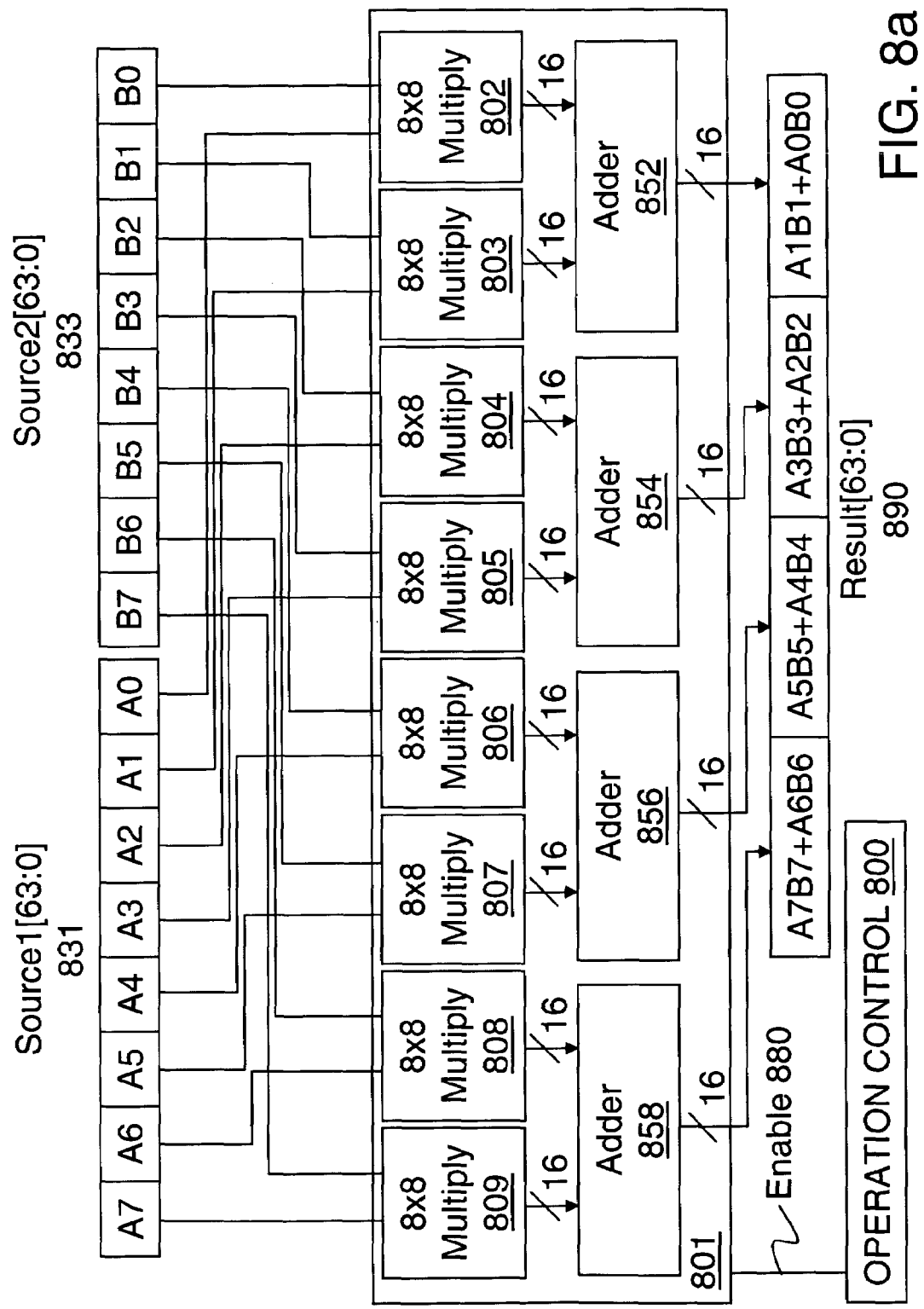
FIGS. 8a-8e illustrate alternative embodiments of circuits for performing multiply-add and multiply-subtract operations on packed data.

FIG. 8a illustrates a circuit for performing multiply-add and/or multiply-subtract operations on packed data according to one embodiment of the invention. FIG. 8a depicts a first source, Source1[63:0] 831, and a second source, Source2[63:0] 833. In one embodiment, the first and second sources are stored in N-bit long SIMD registers, such as for example 128-bit Intel® SSE2 XMM registers, or for example 64-bit MMX™ registers. For two pixel vectors 831 and 833, the multiply-add instruction implemented on such registers would give the following results, Result[63:0] 890, which are stored to the destination. Accordingly, the example shows an 8-bit byte to 16-bit word embodiment of a multiply-add instruction 142 (FIG. 1). For one alternative embodiment of the multiply-add instruction, bytes in one of the sources may be signed and in the other they may be unsigned. While in some specific examples, packed data sources and destinations may be represented as having 64-bits, it will be appreciated that the principals disclosed herein may be extended to other conveniently selected lengths, such as 80-bits, 128-bits or 256-bits.

For one alternative embodiment, a source register with unsigned data is also the destination register with the 16-bit multiply-accumulate results. One reason for such a choice is that in many implementations, pixel data may be unsigned and coefficients may be signed. Accordingly, it may preferable to overwrite the pixel data because the pixel data is less likely to be needed in future calculations.

Operation control 800 outputs signals on Enable 880 to control operations performed by packed multiply-adder/subtracter 801. One embodiment of operation control 800 may comprise, for example, a decoder 165 and an instruction pointer register 211. Of course, operation control 800 may also comprise additional circuitry which is not necessary to understanding the invention. Packed multiply-adder/subtracter 801 includes: 8×8 multiply 802 through 8×8 multiply 809. 8×8 multiply 802 has 8-bit inputs A0 of Source1 831 and B0 of Source2 833. 8×8 multiply 803 has 8-bit inputs A1 and B1. 8×8 multiply 804 has 8-bit inputs A2 and B2. 8×8 multiply 805 has 8-bit inputs A3 and B3. 8×8 multiply 806 has 8-bit inputs A4 and B4. 8×8 multiply 807 has 8-bit inputs A5 and B5. 8×8 multiply 808 has 8-bit inputs A6 and B6. 8×8 multiply 809 has 8-bit inputs A7 and B7. The 16-bit intermediate results generated by 8×8 multiply 802 and 8×8 multiply 803 are received by adder 852, the 16-bit intermediate results generated by 8×8 multiply 804 and 8×8 multiply 805 are received by adder 854, the 16-bit intermediate results generated by 8×8 multiply 806 and 8×8 multiply 806 are received by adder 856 and the 16-bit intermediate results generated by 8×8 multiply 808 and 8×8 multiply 809 are received by adder 858.

Based on whether the current instruction is a multiply/add or multiply/subtract instruction, adder 852 through adder 858 add or subtract their respective 16-bit inputs. The output of adder 852 (i.e., bits 15 through 0 of the Result), the output of adder 854 (i.e., bits 31 through 16 of the Result), the output of adder 856 (i.e., bits 47 through 32 of the Result) and the output of adder 858 (i.e., bits 63 through 48 of the Result) are combined into a 64-bit packed result and communicated to Result[b 63:0] 890.

Alternative embodiments of byte multiply-add/subtract instructions may include but are not limited to operations for unsigned packed bytes in both sources and operations for signed packed bytes in both sources. Other alternative embodiments of multiply-add/subtract instructions may include operations that apply to pairs of 16-bit signed words to produce 32-bit signed product. Some embodiments of multiply-add/subtract instructions may saturate results while some alternative embodiments may truncate results.

Figure 8B:
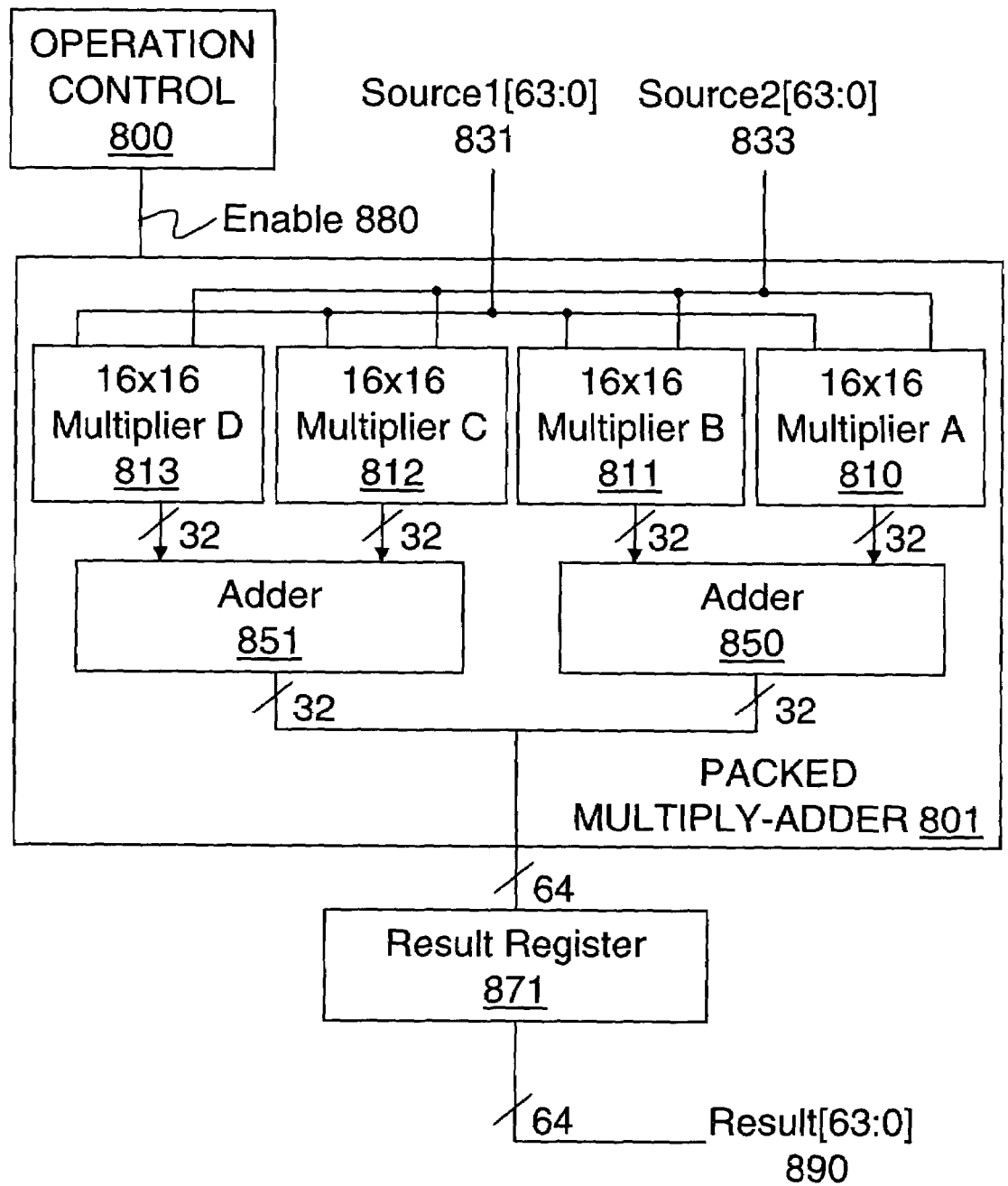

FIG. 8b illustrates another circuit for performing multiply-add and/or multiply-subtract operations on packed data according to one alternative embodiment of the invention. Operation control 800 processes the control signal for the multiply-add and multiply-subtract instructions. Operation control 800 outputs signals on Enable 880 to control Packed multiply-adder/subtracter 801.

Packed multiply-adder/subtracter 801 has the following inputs: Source1[63:0] 831, Source2[63:0] 833, and Enable 880. Packed multiply-adder/subtracter 801 includes four 16×16 multiplier circuits: 16×16 multiplier A 810, 16×16 multiplier B 811, 16×16 multiplier C 812 and 16×16 multiplier D 813. 16×16 multiplier A 810 has as inputs Source1 [15:0] and Source2[15:0]. 16×16 multiplier B 811 has as inputs Source1[31:16] and Source2[31:16]. 16×16 multiplier C 812 has as inputs Source1[47:32] and Source2[47:32].

16×16 multiplier D 813 has as inputs Source1[63:48] and Source2[63:48]. The 32-bit intermediate results generated by 16×16 multiplier A 810 and 16×16 multiplier B 811 are received by adder 850, while the 32-bit intermediate results generated by 16×16 multiplier C 812 and 16×16 multiplier D 813 are received by adder 851.

Based on whether the current instruction is a multiply-add or multiply-subtract instruction, adder 850 and adder 851 add or subtract their respective 32-bit inputs. The output of adder 850 (i.e., bits 31 through 0 of the Result) and the output of adder 851 (i.e., bits 63 through 32 of the Result) are combined into the 64-bit Result and communicated to Result Register 871.

In one embodiment, each of adder 851 and adder 850 are composed of four 8-bit adders with the appropriate propagation delays. However, alternative embodiments could implement adder 851 and adder 850 in any number of ways (e.g., two 32-bit adders and/or redundant arithmetic compression circuitry).

To perform the equivalent of these multiply-add or multiply-subtract instructions in prior art processors which operate on unpacked data, four separate 64-bit multiply operations and two 64-bit add or subtract operations, as well as the necessary load and store operations, would be needed. This wastes data lines and circuitry that are used for the bits that are higher than bit sixteen for Source1 and Source 2, and higher than bit thirty two for the Result. As well, the entire 64-bit result generated by the prior art processor may not be of use to the programmer. Therefore, the programmer may have to truncate or saturate each result.

Performing the equivalent of this multiply-add instruction using the prior art DSP processor described with reference to Table 1 requires one instruction to zero the accumulation value and four multiply accumulate instructions. Performing the equivalent of this multiply-add instruction using the prior art DSP processor described with reference to Table 2 requires one instruction to zero the accumulation value and 2 multiply-accumulate instructions.

Figure 8C:
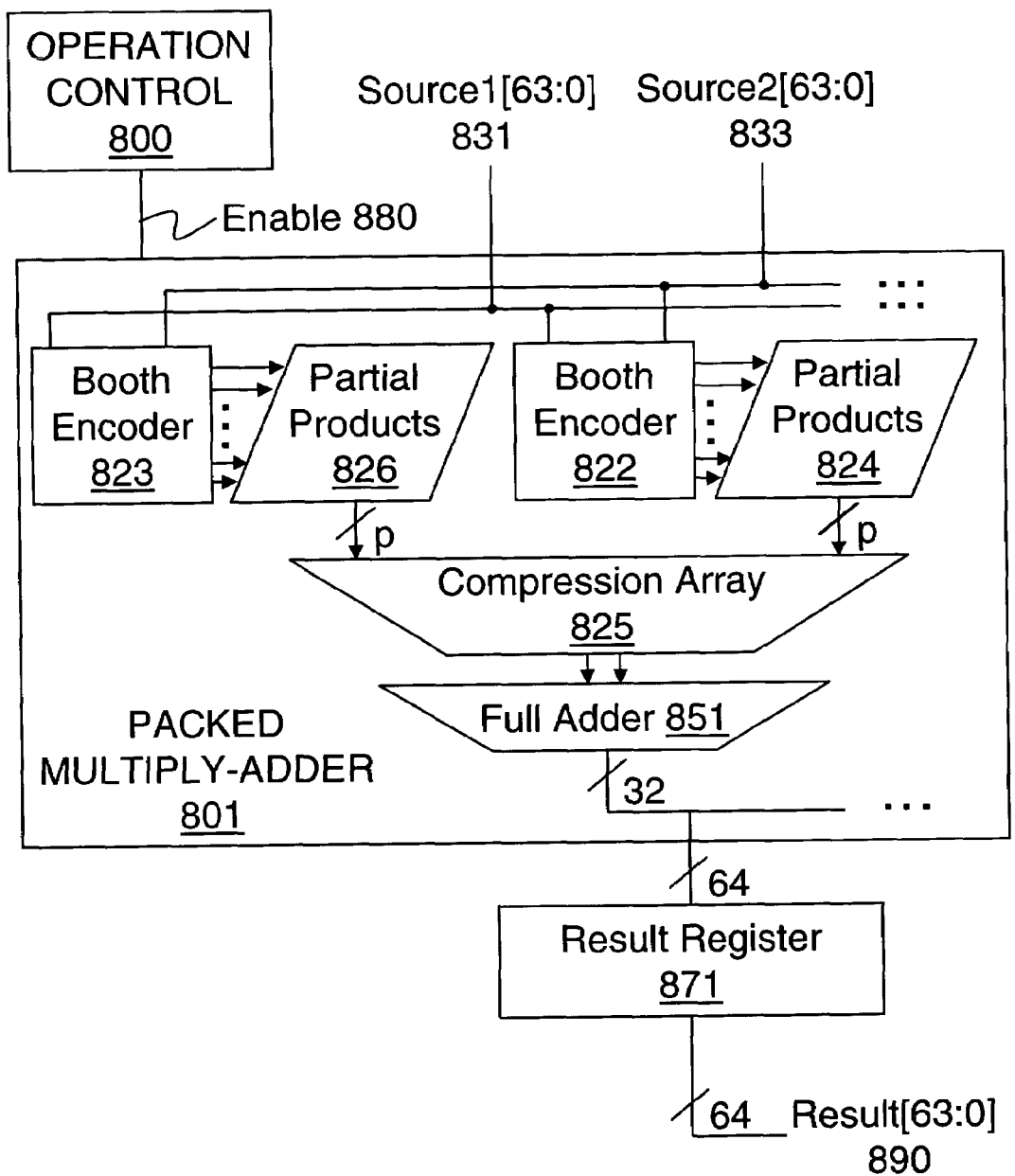

FIG. 8c illustrates details of a circuit for performing multiply-add and/or multiply-subtract operations on packed word data according to another alternative embodiment of the invention. Operation control 800 outputs signals on Enable 880 to control Packed multiply-adder/subtracter 801. Packed multiply-adder/subtracter 801 has inputs: Source1[63:0] 831, Source2[63:0] 833, and Enable 880. Packed multiply-adder/subtracter 801 includes 16×16 multiplier circuits and 32-bit adders. A first 16×16 multiplier comprises booth encoder 823, which has as inputs Source1[63:48] and Source2[63:48]. Booth encoder 823 selects partial products 826 based on the values of its inputs Source1[63:48] and Source2[63:48]. A second 16×16 multiplier comprises booth encoder 822, which has as inputs Source1[47:32] and Source2[47:32]. Booth encoder 822 selects partial products 824 based on the values of its inputs Source1[47:32] and Source2[47:32]. For example, in one embodiment of Booth encoder 822, the three bits, Source1[47:45], may be used to select a partial product of zero (if Source1[47:45] are 000 or 111); Source2[47:32] (if Source1[47:45] are 001 or 010); 2 times Source2[47:32] (if Source1[47:45] are 011); negative 2 times Source2[47:32] (if Source1[47:45] are 100); or negative 1 times Source2[47:32] (if Source1[47:45] are 101 or 110). Similarly, Source1[45:43], Source1[43:41], Source1[41:39], etc. maybe used to select their respective partial products 824.

Partial products 824 and partial products 826 are provided as inputs to compression array 825, each group of partial products being aligned in accordance with the respective bits from Source1 used to generation them. For one embodiment compression array 825 may be implemented as a Wallace tree structure of carry-save adders. For alternative embodiments compression array 825 may be implemented as a sign-digit adder structure. The intermediate results from compression array 825 are received by adder 851.

Based on whether the current instruction is a multiply-add or multiply-subtract instruction, compression array 825 and adder 851 add or subtract the products. The outputs of the adders including adder 851 (i.e., bits 63 through 32 of the Result) are combined into the 64-bit Result and communicated to Result Register 871. It will be appreciated that alternative embodiments of packed multiplier-adder/subtracter may accept source inputs of various sizes, 128 bits for example.

Figure 8D:
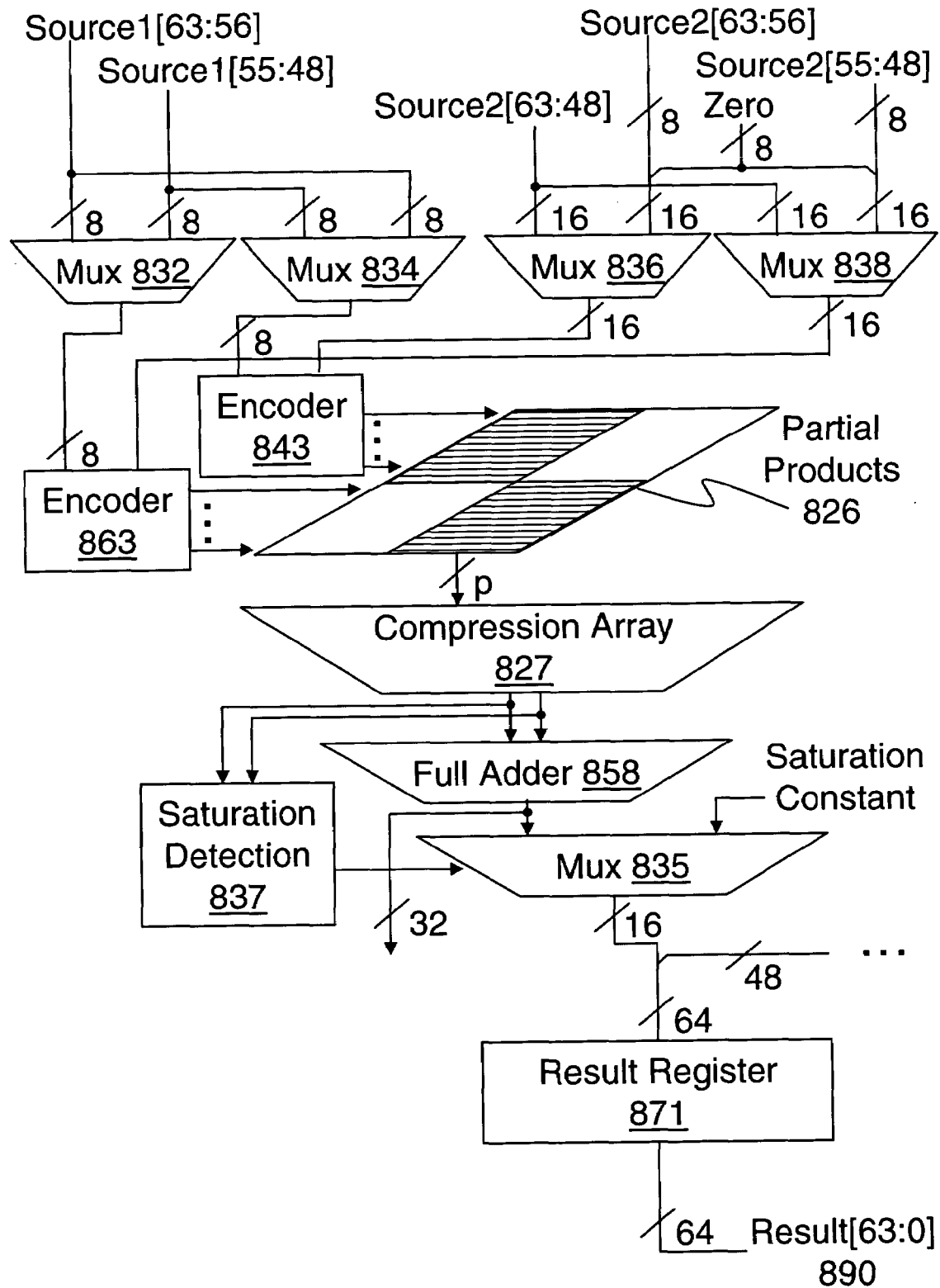

FIG. 8d illustrates a circuit for performing multiply-add and/or multiply-subtract operations on packed byte data or packed word data according to another alternative embodiment of the invention. The packed multiply-add/subtract circuit of FIG. 8d has inputs: Source1[63:48], Source2[63:48]. For one embodiment, when multiplexer (MUX) 832 selects Source1[63:56], MUX 834 selects Source1[55:48], and when MUX 836 and MUX 838 select Source2[63:48], a 16×16 multiplication may be performed substantially as described with reference to FIG. 8c. On the other hand, when MUX 832 selects Source1[55:48], MUX 834 selects Source1[63:56], MUX 836 selects Source2[63:56] and MUX 838 select Source2[55:48], two 8×8 multiplications maybe performed as described below.

A 16×16 multiplier comprises encoder 863, which has as inputs Source1[55:48] from MUX 832 and Source2[55:48] from MUX 838. Encoder 863 selects partial products for the lower portion of partial products 826. Source2[55:48] from MUX 838 has eight upper bits padded with zeroes, and so the lower right quadrant of partial products 826 corresponds to partial products for the byte multiplication of Source1[55:48] and Source2[55:48], while the lower left quadrant of partial products 826 contains zeroes. The 16×16 multiplier further comprises encoder 843, which has as inputs Source1[63:56] from MUX 834 and Source2[63:56] from MUX 836. Encoder 843 selects partial products for the upper portion of partial products 826. Source2[63:56] from MUX 836 has eight lower bits padded with zeroes so the upper left quadrant of partial products 826 corresponds to partial products for the byte multiplication of Source1[63:56] and Source2[63:56], while the upper right quadrant of partial products 826 contains zeroes. It will be appreciated that by aligning the partial products as described, addition of the two 16-bit products is facilitated through addition of the partial products.

Partial products 826 are provided as inputs to compression array 827, which provides inputs to full adder 858. Partial products 826 may be aligned to also facilitate generation of a 32-bit result. Therefore, in such cases, the outputs of full adder 858 corresponding to bits twenty-three through eight contain the 16-bit sum that may be provided to MUX 835, while the full 32-bit output of full adder 858 may be provided, for example, to full adder 851 when performing multiply-add/subtract operations on packed word data. For one embodiment, the outputs of the adders including adder 858 are optionally saturated to signed 16-bit values (i.e., bits 63 through 48 of the Result) are and are then combined into the 64-bit Result and communicated to Result Register 871.

For one embodiment of saturation detection logic 837, all of the bits corresponding to the result may be examined in order to determine when to saturate. It will be appreciated that alternative embodiments of multiply-add/subtract operations, saturation detection logic 837 may examine less than all of the bits corresponding to the result.

From the inputs it is possible to determine the direction of the potential saturation and select a saturation constant to provide to MUX 851. A signed result has the potential to saturate to a negative hexadecimal value of 8000, only if both products are negative. For example, when one packed byte source has unsigned data elements and the other packed byte source has signed data elements, the negative hexadecimal saturation value of 8000 may be provided as the saturation constant to MUX 851 when both signed data elements, Source2[63:56] and Source2[55:48] for example, are negative. Similarly, since a signed result has the potential to saturate to a positive value, only if both products are positive, the positive hexadecimal saturation value of 7FFF may be provided as the saturation constant to MUX 851 when both signed data elements, Source2[63:56] and Source2[55:48] for example, are positive.

For one embodiment of the multiply-add/subtract only particular bit patterns may occur in signed results. Therefore it may be possible for saturation detection logic to identify the particular bit patterns which saturate. For example, using the sum bits, at bit positions 15 and 16 of a 17-bit adder prior to carry propagation and also using the carry-out of bit position 14, saturation detection logic may signal MUX 835 to saturate when sum[16:15] are 01, when sum[16:15] are 00 and Cout14 is 1, or when sum[16:15] are 10 and Cout14 is 0. Therefore saturation detection logic 837 may detect saturation before a final result is available from full adder 851.

Figure 8E:
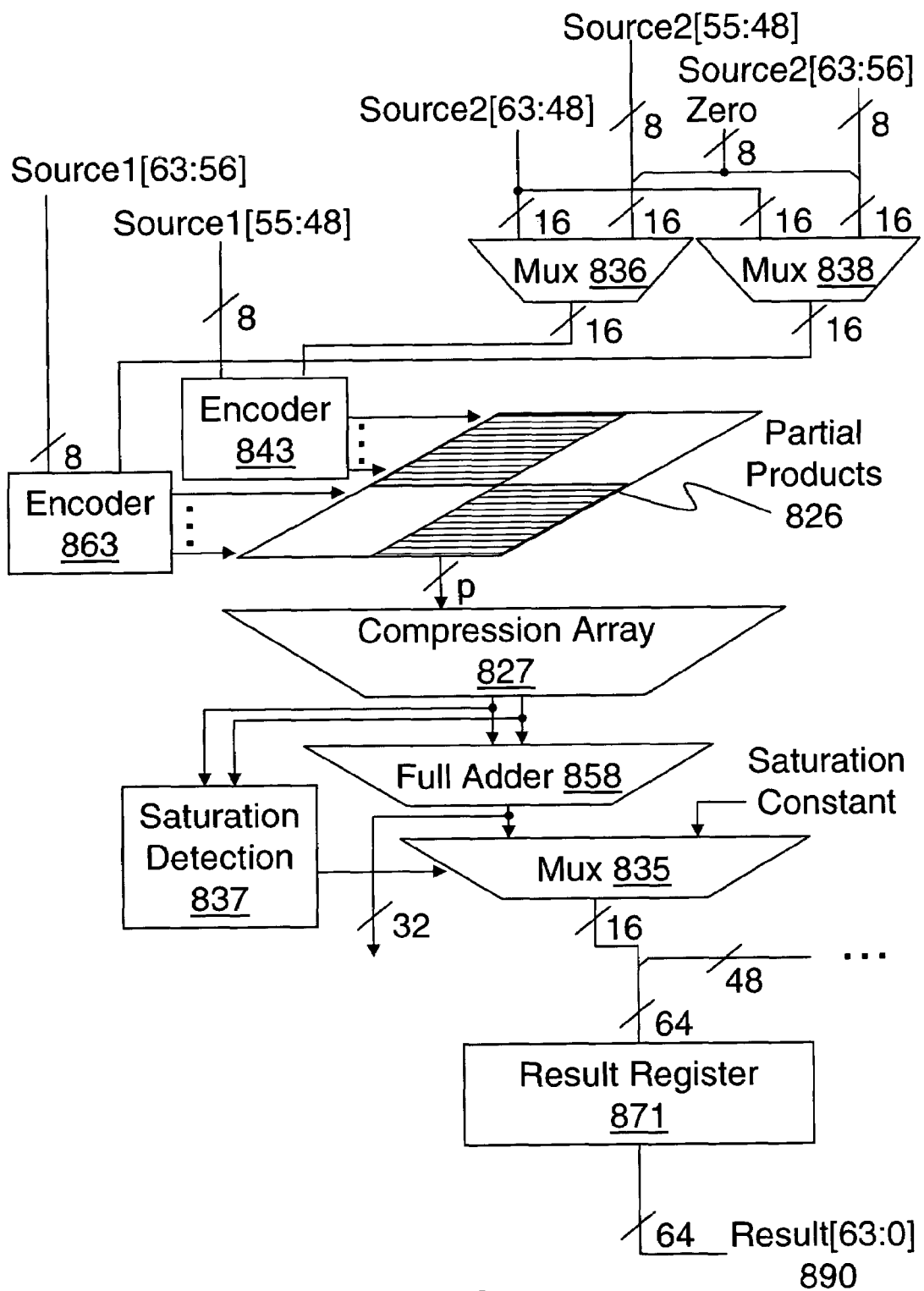

FIG. 8e illustrates another circuit for performing multiply-add and/or multiply-subtract operations on packed byte data or packed word data according to another alternative embodiment of the invention. The packed multiply-add/subtract circuit of FIG. 8e has inputs: Source1[63:48], Source2[63:48]. For one embodiment, when MUX 836 and MUX 838 select Source2[63:48], a 16×16 multiplication may be performed substantially as described with reference to FIG. 8c. On the other hand, when MUX 836 selects Source2[55:48] and MUX 838 select Source2[63:56], two 8×8 multiplications may be performed as described below.

A 16×16 multiplier comprises encoder 863, which has as inputs Source1[63:56] and Source2[63:56] from MUX 838. Encoder 863 selects partial products for the lower portion of partial products 826. Source2[63:56] from MUX 838 has eight upper bits padded with zeroes, and so the lower right quadrant of partial products 826 corresponds to partial products for the byte multiplication of Source1[63:56] and Source2[63:56], while the lower left quadrant of partial products 826 contains zeroes. The 16×16 multiplier further comprises encoder 843, which has as inputs Source1[55:48] and Source2[55:48] from MUX 836. Encoder 843 selects partial products for the upper portion of partial products 826. Source2[55:48] from MUX 836 has eight lower bits padded with zeroes so the upper left quadrant of partial products 826 corresponds to partial products for the byte multiplication of Source1[55:48] and Source2[55:48], while the upper right quadrant of partial products 826 contains zeroes. It will be appreciated that by aligning the partial products as described, addition of the two 16-bit products is facilitated through addition of the partial products.

Partial products 826 are provided as inputs to compression array 827, which provides inputs to full adder 858. Full adder 858 output bits twenty-three through eight contain the 16-bit sum that may be provided to MUX 835, while the full 32-bit output of full adder 858 may be provided, for example, to full adder 851 when performing multiply-add/subtract operations on packed word data. From the inputs it is possible to determine the direction of the potential saturation and select a saturation constant to provide to MUX 851. Saturation detection logic 837 may detect saturation before a final result is available from full adder 851. For one embodiment, the outputs of the adders including adder 858 are optionally saturated to signed 16-bit values (i.e., bits 63 through 48 of the Result) are and are then combined into the 64-bit Result and communicated to Result Register 871.

Advantages of Including the Described
Multiply-Add Instruction(s) in the Instruction Set As previously described, the prior art multiply accumulate instructions always add the results of their multiplications to an accumulation value. This accumulation value becomes a bottleneck for performing operations other than multiplying and accumulating (e.g., the accumulation value must be cleared each time a new set of operations is required which do not require the previous accumulation value). This accumulation value also becomes a bottleneck if operations, such as rounding, need to be performed before accumulation.

In contrast, the disclosed multiply-add/subtract instructions do not carry forward an accumulation value. As a result, these instructions are easier to use in a wider variety of algorithms. In addition, software pipelining can be used to achieve comparable throughput. To illustrate the versatility of the multiply-add instruction, several example multimedia algorithms are described below. Some of these multimedia algorithms use additional packed data instructions. The operation of these additional packed data instructions are shown in relation to the described algorithms. For a further description of these packed data instructions, see "A Set of Instructions for Operating on Packed Data," filed on Aug. 31, 1995, application Ser. No. 521,360. Of course, other packed data instructions could be used. In addition, a number of steps requiring the use of general purpose processor instructions to manage data movement, looping, and conditional branching have been omitted in the following examples.

1) Multiplication of Complex Numbers

The disclosed multiply-add instruction can be used to multiply two complex numbers in a single instruction as shown in Table 6a. As previously described, the multiplication of two complex number (e.g., $r_1\ i_1$ and $r_2\ i_2$) is performed according to the following equation:

Real Component=$r_1 \cdot r_2 - i_1 \cdot i_2$

Imaginary Component=$r_1 \cdot i_2 + r_2 \cdot i_1$

If this instruction is implemented to be completed every clock cycle, the invention can multiply two complex numbers every clock cycle.

TABLE 6a

| Multiply-Add Source1, Source2 | | | | |
|---|---|---|---|---|
| $r_1$ | $i_1$ | $r_1$ | $i_1$ | Source1 |
| $r_2$ | $-i_2$ | $i_2$ | $r_2$ | Source2 |
| = | | | | |
| Real Component: $r_1 r_2 - i_1 i_2$ | | Imaginary Component: $r_1 i_2 + r_2 i_1$ | | Result1 |

As another example, Table 6b shows the instructions used to multiply together three complex numbers.

TABLE 6b

Multiply-Add Source1, Source2

| $r_1$ | $i_1$ | $r_1$ | $i_1$ | Source1 |
|---|---|---|---|---|
| $r_2$ | $-i_2$ | $i_2$ | $r_2$ | Source2 |
| = | | | | |
| Real Component$_1$: | | Imaginary Component$_1$: | | Result1 |
| $r_1r_2 - i_1i_2$ | | $r_1i_2 + r_2i_1$ | | |

Packed Shift Right Source1, Source2

| Real Component$_1$ | Imaginary Component$_1$ | Result1 |
|---|---|---|
| | 16 | |
| = | | |
| Real Component$_1$ | Imaginary Component$_1$ | Result2 |

Pack Result2, Result2

| Real Component$_1$ | | Imaginary Component$_1$ | | Result2 |
|---|---|---|---|---|
| Real Component$_1$ | | Imaginary Component$_1$ | | Result2 |
| = | | | | |
| Real Component$_1$ | Imaginary Component$_1$ | Real Component$_1$ | Imaginary Component$_1$ | Result3 |

Multiply-Add Result3, Source3

| Real Component$_1$: | Imaginary Component$_1$: | Real Component$_1$: | Imaginary Component$_1$: | Result3 |
|---|---|---|---|---|
| $r_1r_2 - i_1i_2$ | $r_1i_2 + r_2i_1$ | $r_1r_2 - i_1i_2$ | $r_1i_2 + r_2i_1$ | |
| $r_3$ | $-i_3$ | $i_3$ | $r_3$ | Source3 |
| = | | | | |
| Real Component$_2$ | | Imaginary Component$_2$ | | Result4 |

2) Multiply Accumulation Operations

The disclosed multiply-add instructions can also be used to multiply and accumulate values. For example, two sets of four data elements ($A_{1-4}$ and $B_{1-4}$) may be multiplied and accumulated as shown below in Table 7. In one embodiment, each of the instructions shown in Table 7 is implemented to complete each clock cycle.

TABLE 7

Multiply-Add Source1, Source2

| 0 | 0 | $A_1$ | $A_2$ | Source1 |
|---|---|---|---|---|
| 0 | 0 | $B_1$ | $B_2$ | Source2 |
| = | | | | |
| 0 | | $A_1B_1 + A_2B_2$ | | Result1 |

Multiply-Add Source3, Source4

| 0 | 0 | $A_3$ | $A_4$ | Source3 |
|---|---|---|---|---|
| 0 | 0 | $B_3$ | $B_4$ | Source4 |
| = | | | | |
| 0 | | $A_3A_4 + B_3B_4$ | | Result2 |

Unpacked Add Result1, Result2

| 0 | $A_1B_1 + A_2B_2$ | Result1 |
|---|---|---|
| 0 | $A_3A_4 + B_3B_4$ | Result2 |
| = | | |
| 0 | $A_1B_1 + A_2B_2 + A_3A_4 + B_3B_4$ | Result3 |

If the number of data elements in each set exceeds 8 and is a multiple of 4, the multiplication and accumulation of these sets requires fewer instructions if performed as shown in table 8 below.

TABLE 8

Multiply-Add Source1, Source2

| $A_1$ | $A_2$ | $A_3$ | $A_4$ | Source1 |
|---|---|---|---|---|
| $B_1$ | $B_2$ | $B_3$ | $B_4$ | Source2 |
| = | | | | |
| $A_1B_1 + A_2B_2$ | | $A_3B_3 + A_4B_4$ | | Result1 |

TABLE 8-continued

Multiply-Add Source3, Source4

| $A_5$ | $A_6$ | $A_7$ | $A_8$ | Source3 |
|---|---|---|---|---|
| $B_5$ | $B_6$ | $B_7$ | $B_8$ | Source4 |
| = | | | | |
| $A_5B_5 + A_6B_6$ | | $A_7B_7 + A_8B_8$ | | Result2 |

Packed Add Result1, Result2

| $A_1B_1 + A_2B_2$ | $A_3B_3 + A_4B_4$ | Result1 |
|---|---|---|
| $A_5B_5 + A_6B_6$ | $A_7B_7 + A_8B_8$ | Result2 |
| = | | |
| $A_1B_1 + A_2B_2 + A_5B_5 + A_6B_6$ | $A_3B_3 + A_4B_4 + A_7B_7 + A_8B_8$ | Result3 |

Unpack High Result3, Source5

| $A_1B_1 + A_2B_2 + A_5B_5 + A_6B_6$ | $A_3B_3 + A_4B_4 + A_7B_7 + A_8B_8$ | Result3 |
|---|---|---|
| 0 | 0 | Source5 |
| = | | |
| 0 | $A_1B_1 + A_2B_2 + A_5B_5 + A_6B_6$ | Result4 |

Unpack Low Result3, Source5

| $A_1B_1 + A_2B_2 + A_5B_5 + A_6B_6$ | $A_3B_3 + A_4B_4 + A_7B_7 + A_8B_8$ | Result3 |
|---|---|---|
| 0 | 0 | Source5 |
| = | | |
| 0 | $A_3B_3 + A_4B_4 + A_7B_7 + A_8B_8$ | Result5 |

Packed Add Result4, Result5

| 0 | $A_1B_1 + A_2B_2 + A_5B_5 + A_6B_6$ | Result4 |
|---|---|---|
| 0 | $A_3B_3 + A_4B_4 + A_7B_7 + A_8B_8$ | Result5 |
| = | | |
| 0 | TOTAL | Result6 |

As another example, Table 9 shows the separate multiplication and accumulation of sets A and B and sets C and D, where each of these sets includes 2 data elements.

TABLE 9

Multiply-Add Source 1, Source2

| $A_1$ | $A_2$ | $C_1$ | $C_2$ | Source1 |
|---|---|---|---|---|
| $B_1$ | $B_2$ | $D_1$ | $D_2$ | Source2 |
| = | | | | |
| $A_1B_1 - A_2B_2$ | | $C_1D_1 - C_2D_2$ | | Result1 |

As another example, Table 10 shows the separate multiplication and accumulation of sets A and B and sets C and D, where each of these sets includes 4 data elements.

TABLE 10

Multiply-Add Source1, Source2

| $A_1$ | $A_2$ | $C_1$ | $C_2$ | Source1 |
|---|---|---|---|---|
| $B_1$ | $B_2$ | $D_1$ | $D_2$ | Source2 |
| = | | | | |
| $A_1B_1 + A_2B_2$ | | $C_1D_1 + C_2D_2$ | | Result1 |

Multiply-Add Source3, Source4

| $A_3$ | $A_4$ | $C_3$ | $C_4$ | Source3 |
|---|---|---|---|---|
| $B_3$ | $B_4$ | $D_3$ | $D_4$ | Source4 |
| = | | | | |
| $A_3B_3 + A_4B_4$ | | $C_3D_3 + C_4D_4$ | | Result2 |

Packed Add Result1, Result2

| $A_1B_1 + A_2B_2$ | $C_1D_1 + C_2D_2$ | Result1 |
|---|---|---|
| $A_3B_3 + A_4B_4$ | $C_3D_3 + C_4D_4$ | Result2 |
| = | | |
| $A_1B_1 + A_2B_2 + A_3B_3 + A_4B_4$ | $C_1D_1 + C_2D_2 + C_3D_3 + C_4D_4$ | Result6 |

3) Dot Product Algorithms

Dot product (also termed as inner product) is used in signal processing and matrix operations. For example, dot product is used when computing the product of matrices, digital filtering operations (such as FIR and IIR filtering), and computing correlation sequences. Since many speech compression algorithms (e.g., GSM, G.728, CELP, and VSELP) and Hi-Fi compression algorithms (e.g., MPEG and subband coding) make extensive use of digital filtering and correlation computations, increasing the performance of dot product increases the performance of these algorithms.

The dot product of two length N sequences A and B is defined as:

$$Result = \sum_{i=0}^{N-1} Ai \cdot Bi$$

Performing a dot product calculation makes extensive use of the multiply accumulate operation where corresponding elements of each of the sequences are multiplied together, and the results are accumulated to form the dot product result.

The dot product calculation can be performed using the multiply-add instruction. For example if the packed data type containing four sixteen-bit elements is used, the dot product calculation may be performed on two sequences each containing four values by:

1) accessing the four sixteen-bit values from the A sequence to generate Source1 using a move instruction;
2) accessing four sixteen-bit values from the B sequence to generate Source2 using a move instruction; and
3) performing multiplying and accumulating as previously described using a multiply-add, packed add, and shift instructions.

For vectors with more than just a few elements the method shown in Table 10 is used and the final results are added together at the end. Other supporting instructions include the packed OR and XOR instructions for initializing the accumulator register, the packed shift instruction for shifting off unwanted values at the final stage of computation. Loop control operations are accomplished using instructions already existing in the instruction set of processor 109.

4) Discrete Cosign Transform Algorithms

Discrete Cosine Transform (DCT) is a well known function used in many signal processing algorithms. Video and image compression algorithms, in particular, make extensive use of this transform.

In image and video compression algorithms, DCT is used to transform a block of pixels from the spatial representation to the frequency representation. In the frequency representation, the picture information is divided into frequency components, some of which are more important than others. The compression algorithm selectively quantizes or discards the frequency components that do not adversely affect the reconstructed picture contents. In this manner, compression is achieved.

There are many implementations of the DCT, the most popular being some kind of fast transform method modeled based on the Fast Fourier Transform (FFT) computation flow. In the fast transform, an order N transform is broken down to a combination of order N/2 transforms and the result recombined. This decomposition can be carried out until the smallest order 2 transform is reached. This elementary 2 transform kernel is often referred to as the butterfly operation. The butterfly operation is expressed as follows:

$X=a*x+b*y$ $Y=c*x-d*y$ where a, b, c and d are termed the coefficients, x and y are the input data, and X and Y are the transform output.

The multiply-add allows the DCT calculation to be performed using packed data in the following manner:

1) accessing the two 16-bit values representing x and y to generate Source1 (see Table 11 below) using the move and unpack instructions;
2) generating Source2 as shown in Table 11 below—Note that Source2 may be reused over a number of butterfly operations; and
3) performing a multiply-add instruction using Source1 and Source2 to generate the Result (see Table 11 below).

TABLE 11

| x | y | x | y | Source1 |
|---|---|---|---|---------|
| a | b | c | d | Source2 |
| a·x + b·y | | c·x·d·y | | Source3 |

In some situations, the coefficients of the butterfly operation are 1. For these cases, the butterfly operation degenerates into just adds and subtracts that may be performed using the packed add and packed subtract instructions.

An IEEE document specifies the accuracy with which inverse DCT should be performed for video conferencing. (See, IEEE Circuits and Systems Society, "IEEE Standard Specifications for the Implementations of 8×8 Inverse Discrete Cosine Transform," IEEE Std. 1180-1990, IEEE Inc. 345 East 47th St., NY, N.Y. 10017, USA, Mar. 18, 1991). The required accuracy is met by the disclosed multiply-add instruction because it uses 16-bit inputs to generate 32-bit outputs.

In this manner, the described multiply-add instruction can be used to improve the performance of a number of different algorithms, including algorithms that require the multiplication of complex numbers, algorithms that require transforms, and algorithms that require multiply accumulate operations. As a result, this multiply-add instruction can be used in a general purpose processor to improve the performance of a greater number algorithms than the described prior art instructions.

Alternative Embodiments

While the described embodiments use 16-bit data elements to generate 32-bit data elements and 8-bit data elements to generate 16-bit data elements, alternative embodiments could use different sized inputs to generate different sized outputs. In addition, while in some described embodiments Source1 and Source 2 each contain 64-bits of data, alternative embodiment could operate on packed data having more or less data. For example, one alternative embodiment operates on packed data having 128-bits of data. While in the described embodiments each multiply-add operation operates on 4 data elements by performing 2 multiplies and 1 addition, alternative embodiments could be implemented to operate on more or less data elements using more or less multiplies and additions. As an example, one alternative embodiment operates on 8 data elements using 4 multiplies (one for each pair of data elements) and 3 additions (2 additions to add the results of the 4 multiplies and 1 addition to add the results of the 2 previous additions).

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims.

What is claimed is:

1. A method for processing digital video, image or audio signal data elements, the method comprising:
   decoding a plurality of instructions including a multiply-add instruction of a variable length instruction format comprising a first and a second opcode field, an addressing mode field, a first source field to indicate a first operand, the first operand having a first plurality of byte data elements including at least $A_1, A_2, A_3$, and $A_4$ byte data elements, and second source field to indicate second operand having a second plurality of byte data elements including at least $B_1, B_2, B_3$, and $B_4$ byte data elements;
   determining a length of the multiply-add instruction from said first opcode field, said addressing mode field, and optionally from said first source field, said second source field and an optional base field; and
   responsive to said second opcode field, enabling an execution unit with the decoded multiply-add instruction to perform the operation $(A_1 \times B_1)+(A_2 \times B_2)$ to generate a first 16-bit data element of a packed result data, and to perform the operation $(A_3 \times B_3)+(A_4 \times B_4)$ to generate a second 16-bit data element of the packed result data.

2. The method of claim 1, said first plurality of byte data elements including at least 16 byte data elements and said second plurality of data elements including at least 16 byte data elements.

3. The method of claim 1, said first plurality of data elements further includng at least $A_5, A_6, A_7$, and $A_8$ as byte data elements, and said second plurality of data elements further including at least $B_5, B_6, B_7$, and $B_8$ as data elements, the method further comprising:
   responsive to said second opcode field, enabling an execution unit with the decoded multiply-add instruction to perform the operation $(A_5 \times B_5)+(A_6 \times B_6)$ to generate a third 16-bit data element of the packed result data, and to perform the operation $(A_7 \times B_7)+(A_8 \times B_8)$ to generate a fourth 16-bit data element of the packed result data.

4. An apparatus to perform the method of claim 3 comprising:
   an operation control unit; and
   a machine-accessible medium including data that, when accessed by said operation control unit responsive to said second opcode field, causes the execution unit to perform the method of claim 3.

5. The method of claim 3 wherein said first source field comprises bits five through three of the variable length instruction format.

6. The method of claim 5 wherein said second source field comprises bits two through zero of the instruction format.

7. The method of claim 6 wherein said first plurality of byte data elements is overwritten by said packed result data responsive to the multiply-add instruction.

8. The method of claim 1 wherein said first plurality of data elements are treated as unsigned bytes.

9. The method of claim 8 wherein said second plurality of data elements are treated as signed bytes.

10. The method of claim 3 wherein each of said first, second, third and fourth 16-bit data elements are generated using signed saturation.

11. An apparatis to perform the method of claim 10 comprising:
    a packed multiply-adder circuit;
    at least one state machine; and
    a machine-accessible medium including data that, when accessed by said at least one state machine, causes said at least one state machine to enable the packed multiply-adder circuit to perform the method of claim 10.

12. The method of claim 1 wherein said decoding a plurality of instructions is performed concurrently.

13. The method of claim 12 wherein said first opcode field is set to a hexadecimal value of 0F38.

14. The method of claim 13 wherein said second opcode field is set to a hexadecimal value of 04.

15. The method of claim 1, wherein each of the first and second operands comprises a unit of data that consists of byte data elements.

16. The method of claim 1, wherein a size in bits of a register used to store the first operand is greater than a size in bits of the first operand.

17. The method of claim 1, wherein each of the first and second operands comprises a unit of data that is fully populated with byte data elements.

18. An apparatus comprising:
    a first input to receive a first packed data comprising at least four byte data elements;
    a second input to receive a second packed data comprising at least four byte data elements;
    a decoder to decode a plurality of instructions including a first instruction comprising a first opcode field having a hexadecimal value of 0F38, a second opcode field having a hexadecimal value of 04, an addressing mode field, a first source field indicating a first location to access said first packed data, and a second source field indicating a second location to access said second packed data;
    a multiply-adder circuit, enabled by the decoded first instruction, to multiply each of a first pair of byte data elements of the first packed data with respective byte data elements of the second packed data and to generate a first 16-bit result representing a first sum of products of the first pair of multiplications, and to multiply each of a second pair of byte data elements of the first packed data with respective byte data elements of the second packed data and to generate a second 16-bit result representing a second sum of products of the second pair of multiplications; and
    an output to store a third packed data comprising at least said first and second 16-bit results in response to the first instruction.

19. The apparatus of claim 15 wherein said first and second packed data each contain at least eight byte data elements.

20. The apparatus of claim 15 wherein said first and second packed data each contain at least sixteen byte data elements.

21. The apparatus of claim 15 wherein the first packed data comprises unsigned byte data elements.

22. The apparatus of claim 15 wherein the second packed data comprises signed byte data elements.

23. The apparatus of claim 19 wherein the first packed data comprises unsigned byte data elements.

24. The apparatus of claim 20 wherein the first and second 16-bit results are generated using signed saturation.

25. The apparatus of claim 15 wherein the multiply-adder circuit comprises a first and a second 16×16 multiplier to perform the first and the second pair of multiplications respectively.

26. The apparatus of claim 18, wherein each of the first and second packed data comprises a unit of data that consists of byte data elements.

27. The apparatus of claim 18, wherein a size in bits of a register representing the first location is greater than a size in bits of the first packed data.

28. The apparatus of claim 18, wherein each of the first and second packed data comprises a unit of data that is fully populated with byte data elements.

29. A computing system comprising:
 an addressable memory to store data;
 a processor including;
  a first storage area to store M packed unsigned byte data elements;
  a second storage area to store M packed signed byte data elements;
  a decoder to decode a first instruction comprising a first opcode field having a hexadecimal value of 0F38, a second opcode field having a hexadecimal value of 04, a first source field indicating said first storage area, and a second source field indicating said second storage area;
  an execution unit, responsive to the decoder decoding the first instruction, to produce M products of multiplication of the packed byte data elements stored in the first storage area by corresponding packed byte data elements store in the second storage area, and to sum the M products of multiplication pairwise to produce M/2 results representing M/2 sums of products; and
  a third storage area to store M/2 packed 16-bit data elements, the third storage area corresponding to a destination specified by the first instruction to store the M/2 results; and
 a magnetic storage device to store said first instruction.

30. The computing system of claim 23 wherein M is 16.

31. The computing system of claim 23 wherein M is 8.

32. The computing system of claim 23 wherein each of said M/2 16-bit results are generated using signed saturation.

* * * * *